US011499668B2

(12) United States Patent
Cooper

(10) Patent No.: US 11,499,668 B2
(45) Date of Patent: Nov. 15, 2022

(54) MONITOR MOUNT WITH CONSTANT TORQUE HINGES

(71) Applicant: Gregory James Cooper, Simi Valley, CA (US)

(72) Inventor: Gregory James Cooper, Simi Valley, CA (US)

( * ) Notice: Subject to any disclaimer, the term of this patent is extended or adjusted under 35 U.S.C. 154(b) by 616 days.

(21) Appl. No.: 16/356,255

(22) Filed: Mar. 18, 2019

(65) Prior Publication Data
US 2019/0346081 A1 Nov. 14, 2019

Related U.S. Application Data

(60) Provisional application No. 62/668,423, filed on May 8, 2018.

(51) Int. Cl.
*F16M 11/38* (2006.01)
*F16M 13/02* (2006.01)
*F16M 13/04* (2006.01)
*F16M 13/00* (2006.01)

(52) U.S. Cl.
CPC .......... *F16M 13/005* (2013.01); *F16M 11/38* (2013.01); *F16M 13/022* (2013.01); *F16M 13/04* (2013.01)

(58) Field of Classification Search
CPC .... F16M 11/38; F16M 13/005; F16M 13/022; F16M 13/04
USPC .......... 248/274.1, 276.1, 324, 688, 919–924; 361/679.55, 679.56
See application file for complete search history.

(56) References Cited

U.S. PATENT DOCUMENTS

| | | | | |
|---|---|---|---|---|
| 6,532,628 B2* | 3/2003 | Kim | ...................... | G06F 1/1601 16/342 |
| 6,570,627 B1* | 5/2003 | Chang | .................. | G06F 1/1601 348/794 |
| 7,021,600 B2* | 4/2006 | Yang | ...................... | F16M 11/10 248/688 |
| 7,239,506 B2* | 7/2007 | Ogawa | .................. | F16M 11/10 248/288.51 |
| 7,249,739 B2* | 7/2007 | Chueh | .................... | F16M 11/10 248/125.2 |
| 7,497,408 B2* | 3/2009 | Lim | ........................ | F16M 11/38 248/284.1 |
| 7,597,302 B2* | 10/2009 | Lee | ........................ | F16M 11/08 248/157 |
| 7,735,797 B2* | 6/2010 | Hu | ......................... | F16M 11/10 248/371 |
| 7,922,133 B2* | 4/2011 | Hsu | ..................... | F16M 11/2014 248/127 |
| 8,215,596 B2* | 7/2012 | Duan | ..................... | F16M 11/10 248/176.1 |
| 8,226,054 B2* | 7/2012 | Chen | ................... | F16M 13/005 248/127 |

(Continued)

*Primary Examiner* — Joshua E Rodden
(74) *Attorney, Agent, or Firm* — Edmond DeFrank

(57) ABSTRACT

The embodiments disclose an apparatus including a television monitor mount with a foldout portion and a predefined main body, a constant torque hinge on a plate having at least one handle configured to be affixed to a structure that can hold other plates and either contains or holds at least one device, VESA mounting holes or equivalent hole configurations with lockable positions using a locking mechanism, and wherein the foldout portion of the mount along with the main body is configured to mount to other mounts or similar devices.

20 Claims, 23 Drawing Sheets

(56) References Cited

U.S. PATENT DOCUMENTS

| | | | | |
|---|---|---|---|---|
| 8,308,113 B2* | 11/2012 | Chen | F16M 11/10 | 248/122.1 |
| 8,649,166 B2* | 2/2014 | Wu | G06F 1/1626 | 361/679.27 |
| 8,670,232 B2* | 3/2014 | Bliven | F16M 11/10 | 361/679.55 |
| 8,733,716 B2* | 5/2014 | Li | G06F 1/1601 | 248/188 |
| 8,950,725 B2* | 2/2015 | Huang | F16M 13/00 | 248/558 |
| 9,255,661 B2* | 2/2016 | Quijano | F16M 11/2021 | |
| 10,051,751 B2* | 8/2018 | Mercier | F16M 11/38 | |
| 10,159,158 B2* | 12/2018 | Park | F16M 11/10 | |
| 2004/0012917 A1* | 1/2004 | Jung | F16M 13/02 | 361/679.02 |
| 2005/0002159 A1* | 1/2005 | Jeong | F16M 11/2021 | 361/679.27 |
| 2005/0205725 A1* | 9/2005 | Yokouchi | F16M 11/18 | 248/125.1 |
| 2005/0247832 A1* | 11/2005 | Cho | F16M 11/2021 | 248/133 |
| 2005/0253040 A1* | 11/2005 | Yang | F16M 11/10 | 248/688 |
| 2006/0049327 A1* | 3/2006 | Chen | F16M 11/105 | 248/371 |
| 2006/0201098 A1* | 9/2006 | Jung | G06F 1/1601 | 52/653.1 |
| 2006/0221264 A1* | 10/2006 | Ogawa | H04N 5/64 | 348/794 |
| 2007/0018061 A1* | 1/2007 | Ogawa | F16M 11/10 | 248/166 |
| 2007/0152125 A1* | 7/2007 | Lee | F16M 11/046 | 248/398 |
| 2007/0272809 A1* | 11/2007 | Jang | F16M 11/105 | 248/133 |
| 2012/0248048 A1* | 10/2012 | Wu | F16M 11/10 | 211/26 |

* cited by examiner

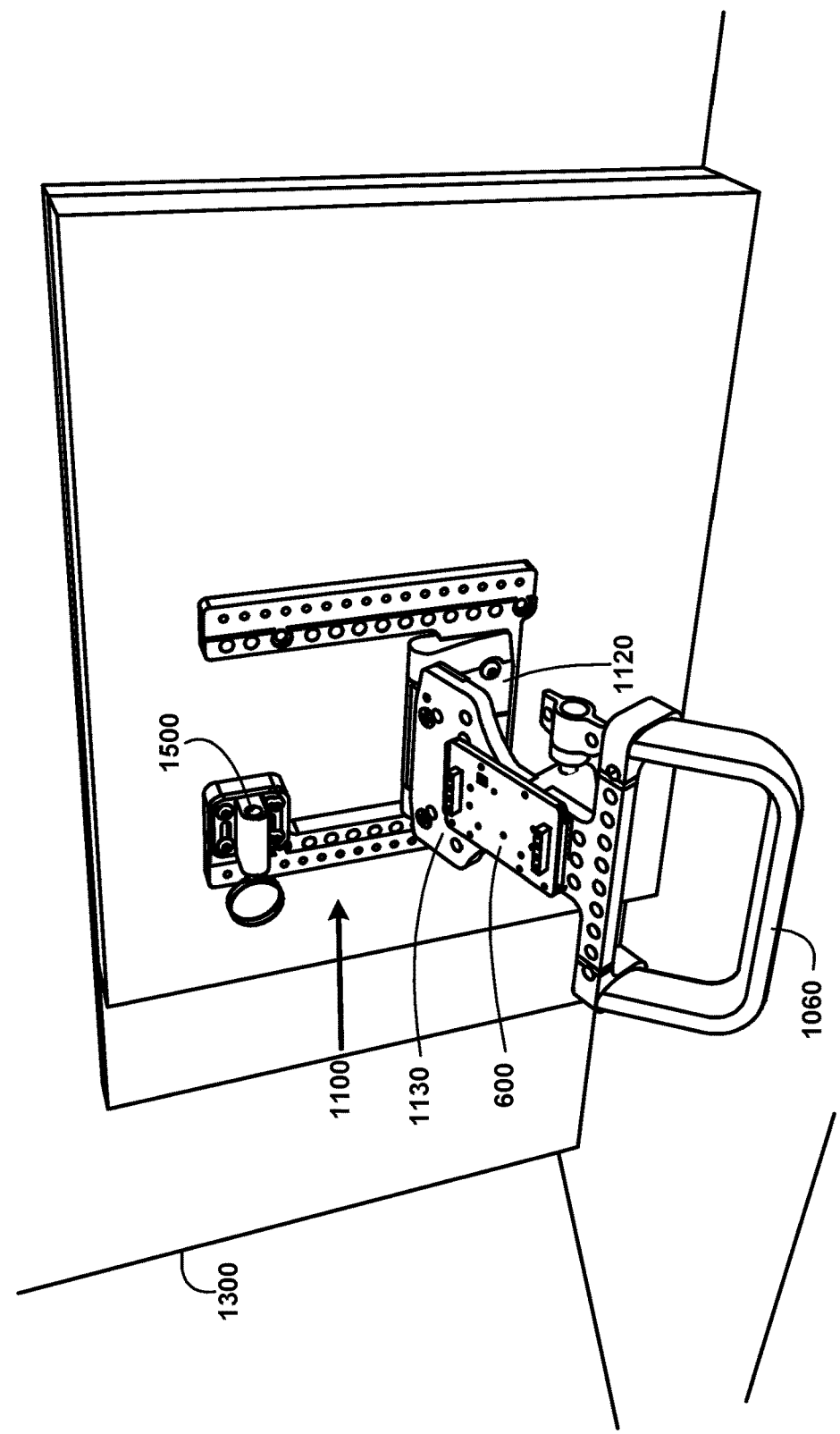

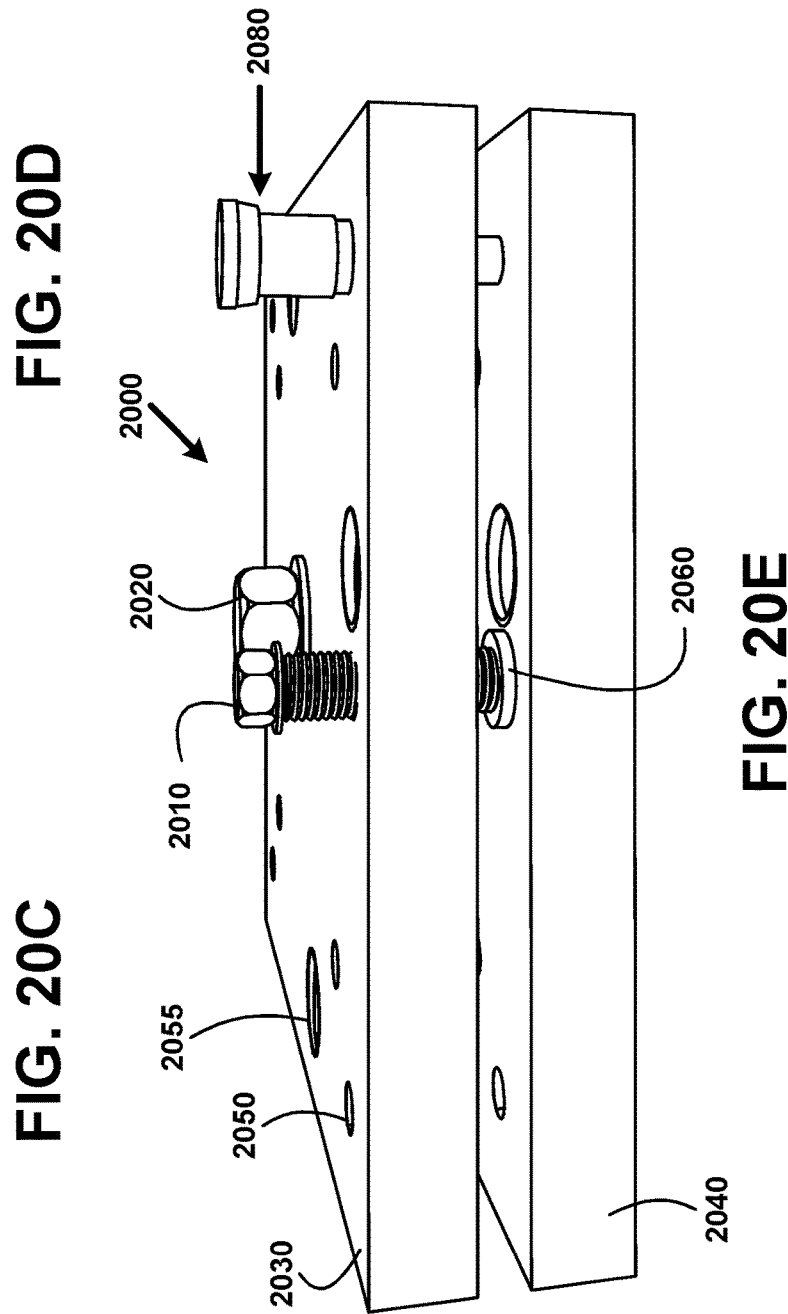

US 11,499,668 B2

MONITOR MOUNT WITH CONSTANT TORQUE HINGES

CROSS-REFERENCE TO RELATED APPLICATIONS

This Patent Application claims priority to United States Patent Application entitled: "Monitor Mount with Friction Hinges", U.S. Ser. No. 62/668,423 filed on May 8, 2018, the U.S. Patent Application being incorporated herein by reference.

BACKGROUND

Flat screen televisions, monitors including smaller/compact or larger high definition televisions/monitors commonly found on film and TV productions sets and control rooms and electronic equipment, brackets, mounting plates, containing embedded or built-in electronics currently require various mounting devices to support their weight and allow a user to adjust the positioning for viewing. A typical wall mounting bracket cannot be used for supporting a monitor on for example a desktop application. Wall and desktop monitor mounting supports do not mount on a pipe stand for example with wheels for movable monitor applications.

BRIEF DESCRIPTION OF THE DRAWINGS

FIG. 16 shows for illustrative purposes only an example of a sub-panel mounted on a folding appendage first embodiment one embodiment.

FIG. 20C shows for illustrative purposes only an example of an unextended indexing pin of one embodiment.

FIG. 20D shows for illustrative purposes only an example of an extended indexing pin of one embodiment.

FIG. 20E shows for illustrative purposes only an example of an extended indexing pin in a rotation device in a locked rotated position of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a monitor mount with constant torque hinges is described for illustrative purposes and the underlying system can apply to any number and multiple types of device mountings. In one embodiment of the present invention, the monitor mount with constant torque hinges can be configured using constant torque hinges. The monitor mount with constant torque hinges can be configured to include bifold desktop appendages and can be configured to include folding appendages using the present invention.

The monitor mount with constant torque hinges includes a number of embodiments. The term and phrase "main body of the mount" in singular or plural may additionally be described herein as "parallel appendages joined with a cross piece" and referred to herein in combination as "mount main body" and "mount" without any change in meaning or function.

Figure 1:
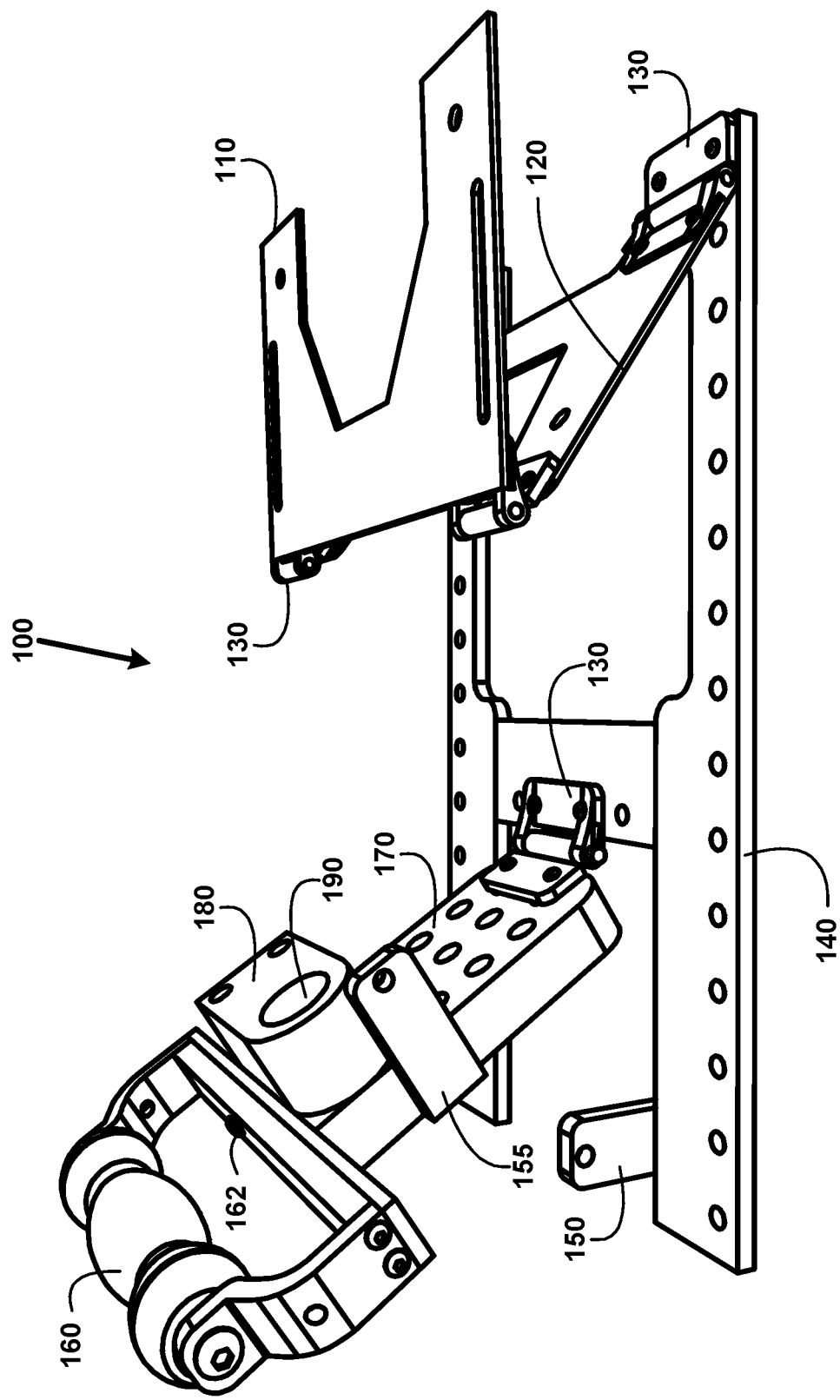
FIG. 1 shows for illustrative purposes only an example of monitor mount with constant torque hinges of one embodiment.

FIG. 1 shows for illustrative purposes only an example of monitor mount with constant torque hinges of one embodiment. FIG. 1 shows a monitor mount with constant torque hinges first embodiment 100 including a folding appendage first embodiment 170 coupled with a constant torque hinge and a coupled bifold desktop free-standing mount 110 and a bifold mount main body appendage 120 coupled with a plurality of a constant torque hinge first embodiment 130. A main body of the mount first embodiment 140 is pair of parallel appendages joined with a cross piece with holes for mounting other devices including the constant torque hinge first embodiment 130 of one embodiment.

Any number of hinged, or non-hinged appendages may be included on the mount to support the monitor's physical position or allow for external devices to be mounted or aide in its use by the operator as a part of the main body of the mount. This can also include mounting external appendages such as handles, latches or hooks. The mount may include the use of various mounting holes, tapped or non-tapped, for attaching additional devices or mounts in any variety of materials as described in this disclosure. The mount main body and mount main body with its sub-plates using constant torque hinges may fold onto itself for compact storing using any predetermined friction amount, having the ability to stay in its stowed position of one embodiment.

The mount main body can include a locking mechanism including a fixed locking feature first embodiment 150 coupled to the monitor mount with constant torque hinges first embodiment 100. The folding appendage including a folding appendage first embodiment 170 coupled to the monitor mount with constant torque hinges first embodiment 100 can include a folding locking feature first embodiment 155. The monitor mount with constant torque hinges first embodiment 100 includes a handle 160 with a center pivot point 162 for rotating the handle 160.

The folding appendage first embodiment 170 can be composed of two separate pieces that will be used as a pivot point. These pieces will be able to slide or grip onto another as they mate, which, when the entirety of folding appendage first embodiment 170 is deployed and extended, will allow the monitor or device to turn side to side (pivot). This junction can be lockable with a locking mechanism such as a knob with a screw or other methods such as compression or by method of friction.

A ball pin may be present within one or more of these pieces, along with a receiving captive hole, to help guide the center position for stowing. The main body of the mount first embodiment 140 and folding appendage first embodiment 170 may also have mating guide rails or pieces, extrusions, or holes in order to line up the extending structure when stowed. This will force the extruding piece to have to be straight when stowing to allow the locking mechanism to work properly and not move while stowed, even if the pivoting junction is not completely tight of one embodiment.

The folding appendage first embodiment 170 can include a mount receptacle appendage first embodiment 180 including a mounting receptacle first embodiment 190. The mounting receptacle first embodiment 190 allows for physically supporting and positioning high definition monitors and other devices by utilizing constant torque hinges, plates and mounting receptacles. It can provide power to these electronics and electronically support them via interconnecting battery holders and electronic devices with the use of its plates and sub-plates. The mount receptacle appendage first embodiment 180 may include attached mounts such as baby pins, C-stand mounts, microphone mount and can include threaded holes which accommodate these attached mounts including wall mounts or other common mounting configurations of one embodiment.

The attached mounts may include clamps, extruding threaded studs, locking screws, locking nuts, thumb screws, friction-style locks, and others to allow the attached mounts to firmly hold onto the device or stand the attached mount is intended to attach to. These attached mounts may be third-party devices permanently attached. The attached mount may be permanently or semi-permanently attached, and it itself may utilize movement by one or more constant torque hinge(s). It may also have additional plates or mounting holes, threaded or through, as to attach other devices, mounts or appendages of one embodiment.

Mount Physical Material Composition

The mount's physical material composition of its main body, and plates may be made of a variety of materials including aluminum, steel, stainless steel and other metals such as potted metal or zinc, plastics, compounds, fabrics, fiberglass, plexiglass, various varieties of wood, or other substrates. The composition may be that of materials used to create a visual display or user feedback operations such as touch screens. The plates may be described also as a third-party object(s) such as electronic equipment, battery, or other flat object that can be described as a "plate". The plates or pieces acting as plates may be composed of solid or hollow, firm or flexible materials, being permeable, semi-permeable or non-permeable in nature.

They may also be composed of conductive materials capable of moving current or data transmission or reception, including as an antenna. They may be altered by heat, bending, or may have friction attributes in of themselves. They may be scraped, milled, or formed in various angles or waves, and cut in various fashions to accommodate other pieces or electronic equipment, or for cosmetic reasons. Any appendage including mounting clamps and supports used for supporting the mount or acting as a clamp on the mount may be composed of materials including aluminum, steel, stainless steel and other metals such as potted metal or zinc, plastics, compounds, fabrics, fiberglass, plexiglass, various varieties of wood, or other substrates of one embodiment.

Battery Power

A sub-mount may incorporate an attached battery that it will function as a method to physically connect an external battery to the main body of the mount, or its appendages. It will also allow a method of carrying DC voltage and current onward to other devices for powering devices attached to the mount, mount sub-plates or other appendage plates and non-attached devices. An attached battery and an appropriate conducting cable composed of one or more conductor of any gauge, in an insulated material may be used in conjunction with an electrical connector attached to that same conducting cable. This may allow the device(s) being used and/or attached on the mount to be powered solely from the attached battery of one embodiment.

The battery may utilize attached or built in electrical connections on a sub-plate to deliver current into the main body of the mount through conducting cables and connections that extend out from the battery to be delivered elsewhere on the mount or its plates or sub-plates. Batteries may include commercial batteries and consumer batteries, and batteries which are used on film and television production equipment for powering. Typically, this can be an Anton Bauer battery, V-mount battery, Sony NP or LP series, or other batteries, rechargeable or one-time-used, which are used to power monitors, cameras, or other devices associated with the use of this mount.

The battery typically provides DC voltage and current at any level and capacity, but may include technology to include AC power at any voltage and current capability. The power supplied from the battery and through the conducting cables and connections, can supply any voltage and current level required of the device to which the mount and sub-plates to which it was designed to hold and power.

At least one battery may also house adaptors or external plugs which source voltage and current from outside sources, such as an external power supply or solar device for recharging. The battery may be charged from other attached or independent non-attached battery or by means of an AC-DC or AC-AC adaptor using wall voltage of one embodiment.

Communication Electronics

The mount may act either independently using embedded and/or mount attached communication electronics or dependently on the device attached to it to provide data transmission, wired or wirelessly, to any external device including smart phones. Communication electronics embedded or attached to the mount that require power can be powered from at least one attached battery and/or non-attached batteries of and/or an AC-DC or AC-AC adaptor using wall voltage. Communication electronics may be coupled to any part of the mount including embedded into the mount and/or as an attached electronic device, to accomplish data transmission between the mount, monitor, outside wireless terminals, other compatible mounts or other devices attached to the mount of one embodiment.

Mating Data/Power Connection from Mount to Monitor

An electronic conductive power tie point may be present on the bottom of the main body mount. This connection would be designed to mate with a connector or power tie point built on to a monitor or other device, which would mate with this mount. When the mount is affixed onto the monitor or other device, the mating connections between the two will make electric contact or be in close enough proximity to pass data information or for passing power. This can eliminate the need for external power cables to the monitor. This mating connection is not limited to power purposes only. It can be used for signal passing, such as fiber (light), capacitive coupling, or any other low voltage signal flow as to pass serial digital or analog information between the two. Additionally, it may be used to help pass wireless transmitted data to and from the monitor and the data from the mount from equipment on its side plate(s).

Sensors

The mount can have numerous types of sensors coupled to it to provide feedback and/or respond to input, wired or wirelessly, from any external device including smart phones. The sensors can include a temperature sensor to detect overheating and cooling temperature regulation issues. The sensors can include a humidity sensor to detect high humidity, which can cause damage to electronics, hinges, devices coupled to the mount or the mount itself. The sensors can also include motion and photo sensors to detect light and motion, including color information. The sensors can also include radiation emission sensors to detect radiation amounts near or associated with the mount. The sensors can also include standard sensors that are associated with a smart phone, such as a gyroscope, accelerometer, pedometer, and other sensors and couple to the smart phone for exchanging and information and data to the mount and devices including devices attached to the mount of one embodiment.

The mount may include power connectors, located anywhere on the mount main body, sub-mount or bifold appendage, for power distribution to other sections or pieces of the mount. These connectors can mate to other compatible connectors such as XLR style 4-pin, or any other connection, to power devices from a given source, such as an external power supply connected into one of these connectors, or from a power source sourced from a sub-plate of one embodiment.

Main Functions

The main function of the mount is to 1) be able to mount a monitor or other device on a pole or stand which utilizes such mounting options as a ⅝-inch "baby-pin" receptacle or other types or receptacles or poles, or 2) utilize the mount as a desktop stand-alone support to a monitor, and/or 3) hold and attach additional plates or equipment onto it.

Mount as Part of a Monitor

The mount may function as a separate unit while attached to a monitor permanently, or it may be designed into a monitor itself, including its housing. In this case, any portion of the mount may be built directly into or designed into the casing of the monitor, whether it be plastic molds or any other molds, or metal pieces, other framing structures or parts that may accommodate the mount. Any portion of the mount may or may not be removable from the monitor dependent on how it is integrated and designed into the monitor. Note that the word use of "monitor" may in fact be used interchangeably with other device to which the mount is affixed, including lighting equipment, computers, computer monitors, etc., or any other device listed in this document.

DETAILED DESCRIPTION

Figure 2:
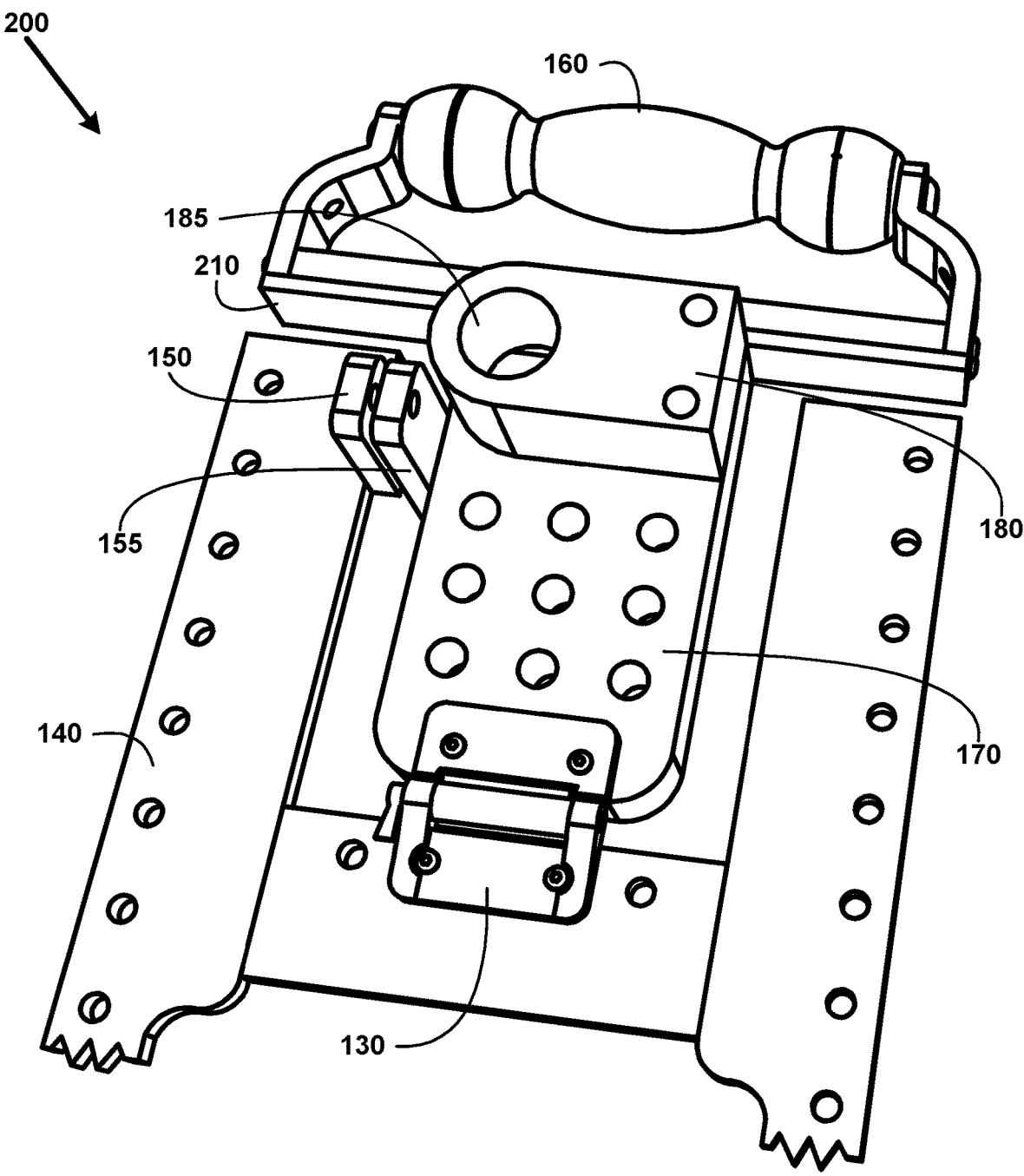
FIG. 2 shows for illustrative purposes only an example of mount main body in stowed position of one embodiment.

FIG. 2 shows for illustrative purposes only an example of mount main body in stowed position of one embodiment. FIG. 2 shows the main body of the mount first embodiment in stowed position 200. In the stowed position the handle 160, folding appendage first embodiment 170, mount receptacle appendage first embodiment 180 with a mount receptacle first embodiment 185 using the constant torque hinge first embodiment 130 are folded flat with the main body of the mount first embodiment 140. The mount may be used to physically and electronically support devices other than monitors. This can include other electronic gear including professional and consumer-based devices, other mount devices, and other objects, batteries, and be affixed to an immovable object such as a wall or desktop surface as to provide a means of supporting various devices and objects. The mount can be used on monitors, devices and/or objects compatible with the mounting configuration. The mount can include mounting holes, tapped and non-tapped, and any additional mounting devices including clips, hinges, slide locks, captive screws and others that may utilize these holes in their attaching to the external equipment of one embodiment.

Locking Mechanisms

Locking mechanisms may be coupled to the mount including the fixed locking feature first embodiment 150 and folding locking feature first embodiment 155. The mount, with its main body and appendages containing a mounting device including a baby-pin, C-stand mount or mounting configurations may include a locking feature to keep the mechanism in any angular degree. In the stowed position, whereas the mount is not typically used then for mounting, a lock mechanism may be present to keep it very close to the rear of the monitor and to prevent it from pulling away from the monitor. The mechanism may be a sliding lock, a sliding pin, a retractable pin, or other pins using springs, or spring latches on either side of the mount. The lock will not come undone until an operator unlatches or unlocks it. This prevents accidental releasing of the mount appendage(s). The locking mechanism also serves to ensure the plate housing the handle will not move, as the monitor can be carried by the handle if it is present on the mount. While the locking mechanism is unlatched and the plate it is holding in place is pulled or pushed out of the way, the plate would then be free to move past that position of one embodiment.

The locking mechanism may be in any position in which the plate can move, only as dependent on the constant torque hinge range of movement which is physically possible. Hardware or other pieces may be attached which allows the movement of a plate to be locked at any angular degree using various shapes and locking mechanisms on the plates, and/or hindered from moving past a certain point. One or more locks may be integrated in the handle or handle supports. These locks may be indexing pins or other type of latches that will keep the handle from moving or sliding if it is designed around mechanisms that allow movement, such as turning or rotating. Locking devices may be used in any other part of the mount, main body and appendages, as described above of one embodiment.

Handle and Stand Mount Locking Mechanism

The handle as part of the mount main body may serve as a means of a lock on the C-stand or other mount receptacle. This will serve as an alternative to a thumb screw which can be used to secure the mount onto the stand. The handle can turn (pivot) in a clockwise and counterclockwise direction. This action will move in, and out, a pin or other piece into the mount receptacle appendage first embodiment 180 which will press against a C-stand or light stand or equivalent metal rod. It may be a spring-loaded action or work on leverage provided by a mechanism between the handle 160 and a handle attachment bar 210 coupled to the handle using the center pivot point 162 of FIG. 1. A clockwise turn on the handle 160 for example will retract a pin or other piece entering the hole through the internal side wall, allowing the stand to be released or inserted. A counterclockwise turn on the handle will force the pin inwards and onto the stand if present, firmly locking the mount onto the stand. In this way a thumbscrew and corresponding screw hole will not be needed to securely fasten the mount onto a stand of one embodiment.

The handle 160 can be coupled to the folding appendage first embodiment 170 coupled with the mount receptacle appendage first embodiment 180 and mount receptacle first embodiment 185 also referred to herein as receptacle. The mount receptacle first embodiment 185 can also be utilized to hold/fasten/power other electronic devices which support the monitor's power requirements or electronic reception and decoding of electronic or optical signals. This may include wired or wireless receiver(s), format converters including SDI to HDMI, or other functions as related to the needs of interfacing with the monitor. The receptacle can also be utilized to hold/fasten/power other electronic devices which support the monitor's power requirements or electronic reception and decoding of electronic or optical signals of one embodiment.

Mount Built-in Electronics

The mount may include built-in electronics/display(s)/computer interfacing devices. A sub-mount may not be composed of simple non-electronic plates acting solely as a method of holding other electronic devices or a battery; the sub-mount may be entirely electronic in nature itself. For example, a visual display made up of electronics may make up the composition of a "plate" to which the constant torque hinges would attach. In this configuration, essentially the mount becomes a viewable display using LED, OLED, Plasma or other such viewable light emitting technology, or the plates may act as housing for such technology.

Additionally, speakers may be integrated in to the plates as well as other electronic interfacing such as buttons, potentiometers, voice recognition technology, fingerprint, eye or other personal recognition technology. The device may take advantage of various forms of wireless data technology to communicate in one direction or bi-directionally as a built-in feature. The mount may also include battery technology to power the actual mount, or may be integrated as part of the mount, or may be an appendage to the mount of one embodiment.

Finishing and Coloring

The materials which make up the plates and integrated mounts may be unfinished, or finished with various coatings such as anodize, paint, oxidation, powder coats, and other finishes and may have varying textures. They may also be coated with rubber, epoxy, hardeners, or plastic, with flexible or non-flexible characteristics. Fabrics may be used as a finish material, or as a covering to the main body or the plates. Finishing colors may be black, white or any shade in between, or any hue, saturation or brightness level. The texture of the mount may be similar to that of sandpaper, low to high grit. It may be smooth, have grooves or have notches. The texture may be altered with the affixing of rubber coating, strips or bars, foam, other kinds of grip material. The finish may be congruent to the device to which it was intended to be used: 1) to look similar the item the mount is intended to be used with and 2) for functionality purposes.

The finishing techniques may also involve engraving, etching, photochemical processes, and laser etching or marking as part of its final appearance and texture of one embodiment.

Mount Bifold Desktop Appendage Fully Extended

Figure 3:
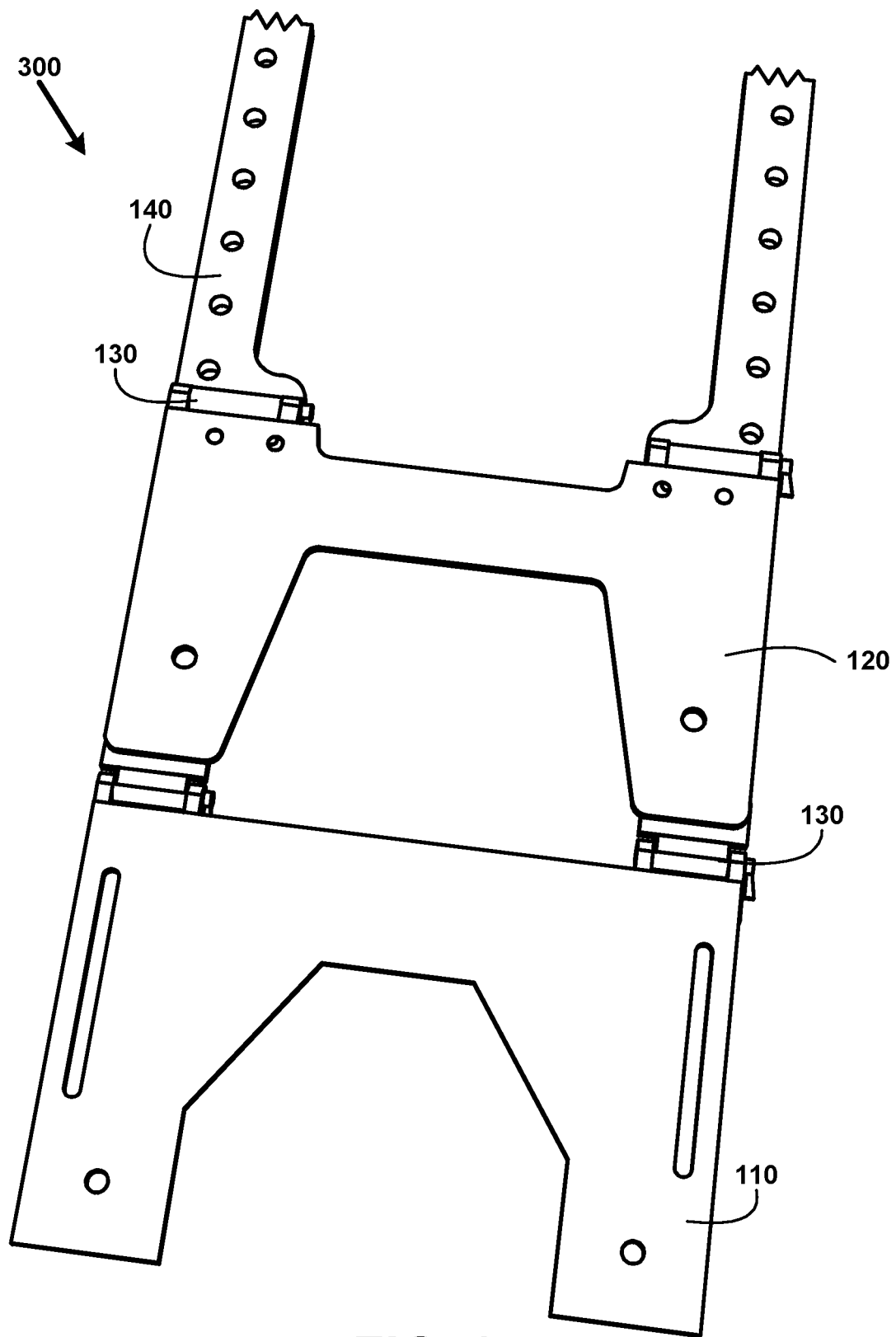
FIG. 3 shows for illustrative purposes only an example of mount bifold desktop appendage fully extended of one embodiment.

FIG. 3 shows for illustrative purposes only an example of mount bifold desktop appendage fully extended of one embodiment. FIG. 3 shows a mount bifold desktop appendage fully extended 300. The bifold desktop free-standing mount 110 is seen coupled to the bifold mount main body appendage 120 using the constant torque hinge first embodiment 130. The bifold mount main body appendage 120 using the constant torque hinge first embodiment 130 is coupled to the main body of the mount 140 of one embodiment.

Mounting Capabilities with Various Devices

The mount can be used for mounting a professional video monitor including smaller/compact or larger high definition televisions/monitors commonly found on film and TV productions sets and control rooms. These monitors may decode and display such as the likes of SDI video, 4K decoded content and beyond, including Ethernet capable streaming video and audio, wireless video and audio, wireless and wired data including protocols such as TCP/IP and other protocols which serve the purpose of displaying video and/or audio. The attached mount utilizes friction, or resistive, hinges including the constant torque hinge first embodiment 130 attached to plates or objects composed of various materials which may physically support the monitors by allowing them to be positioned in various positions, suspended, against other objects, walls or tabletop in tilt, and if the constant torque hinge assembly allows, azimuth and polarization. The plates may also act as appendages which can be used for other functions such as supporting electronic equipment, brackets, mounting plates, or containing embedded or built-in electronics of one embodiment.

Folding Desktop Mount

The mount may include a hinged appendage combination that allow for the monitor to be used specifically as a desktop free-standing mount. The mount, if the size of the monitor allows, extends outward from the monitor as well as downward to a position which extends below and forward of the monitor. Correct positioning will allow the monitor to be free-standing, and the appendages will support the weight of the monitor, other portions of the mount, and other equipment or appendages attached, so as long as the combined weight it is supporting does not exceed the maximum rating of the combined constant torque hinge resistance value. The constant torque hinges are configured to be strong enough to support the weight of the monitor, of which the mount was intended to be able to support based on the monitor's weight and physical dimensions, or other reasons which may prevent the mount from being used safely. This may include impeding plastic or metal pieces or connectors built into the monitor, or, if other devices are attached, these devices as well. The mount will, with proper balance determined by the user and with the correctly specified mount for the device and any additional weight it will carry, physically support it as well as provide adjustments in various movements by means of hinges or constant torque hinges of one embodiment.

The desktop free-standing mount may be integrated into other aspects of the mount, such as other appendages. It is designed to stow into a compact space, and be able to deploy in degrees further than normally required for desktop use. This would allow the plates to be used for other purposes such as supporting arms for other devices, electronic devices, or other mounting plates. Holes, tapped or non-tapped, or slots may be present to bolt down the mount to a flat surface, or to affix other devices or mounts. The mount is made up of two or more plates joined by one or more hinge points, and may fold onto itself in an accordion fashion. The desktop free-standing mount may be integrated into the main mount body or by being physically attached or part of it. The desktop mount may utilize sliding mechanisms as to extend/retract plates from other plates, poles or other affixed hardware to accomplish the task of desktop mounting a monitor. These extensions may contain locking mechanisms or have some element of friction in order to better control their movements of one embodiment.

Sliding Mechanism on Bifold Mount

The bifold desktop mount appendage piece(s) may be either a plate or a configuration which contains extending pieces, plates, rods or other support appendages. These extensions may be a part of the plate. They may fold in on themselves and lock in place, or slide outward in a telescoping fashion and lock in place. The purpose of these telescoping pieces is to support the device which the mount is used on. They act as a balancing method when it is utilized as a desktop mount. They may otherwise serve as an additional mounting for other mounts or equipment of one embodiment.

Mount Bifold Desktop Appendage Folded in One Position

Figure 4:
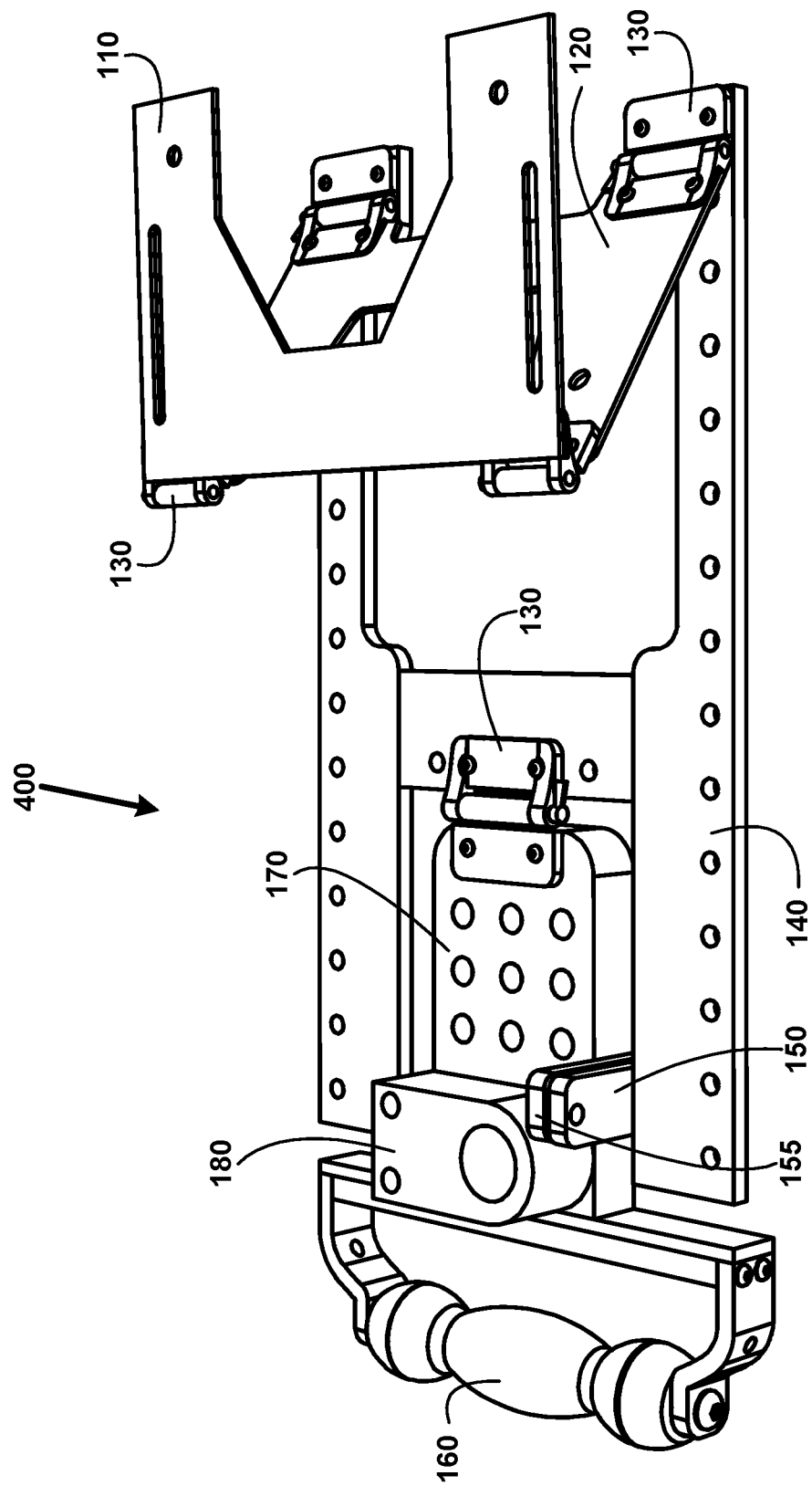
FIG. 4 shows for illustrative purposes only an example of mount bifold desktop appendage folded in one position of one embodiment.

FIG. 4 shows for illustrative purposes only an example of mount bifold desktop appendage folded in one position of one embodiment. FIG. 4 shows a mount bifold desktop appendage folded in one position 400. The fixed locking feature first embodiment 150, folding locking feature first embodiment 155, handle 160, folding appendage first embodiment 170 and mount receptacle appendage 180 are folded flat with the main body of the mount first embodiment 140. The bifold desktop free-standing mount 110 and bifold main body mount appendage 120 are folded into position using the constant torque hinge first embodiment 130 coupled to each other and the main body of the mount first embodiment 140 of one embodiment.

Mount Bifold Desktop Appendage Folded in Stowed Position

Figure 5:
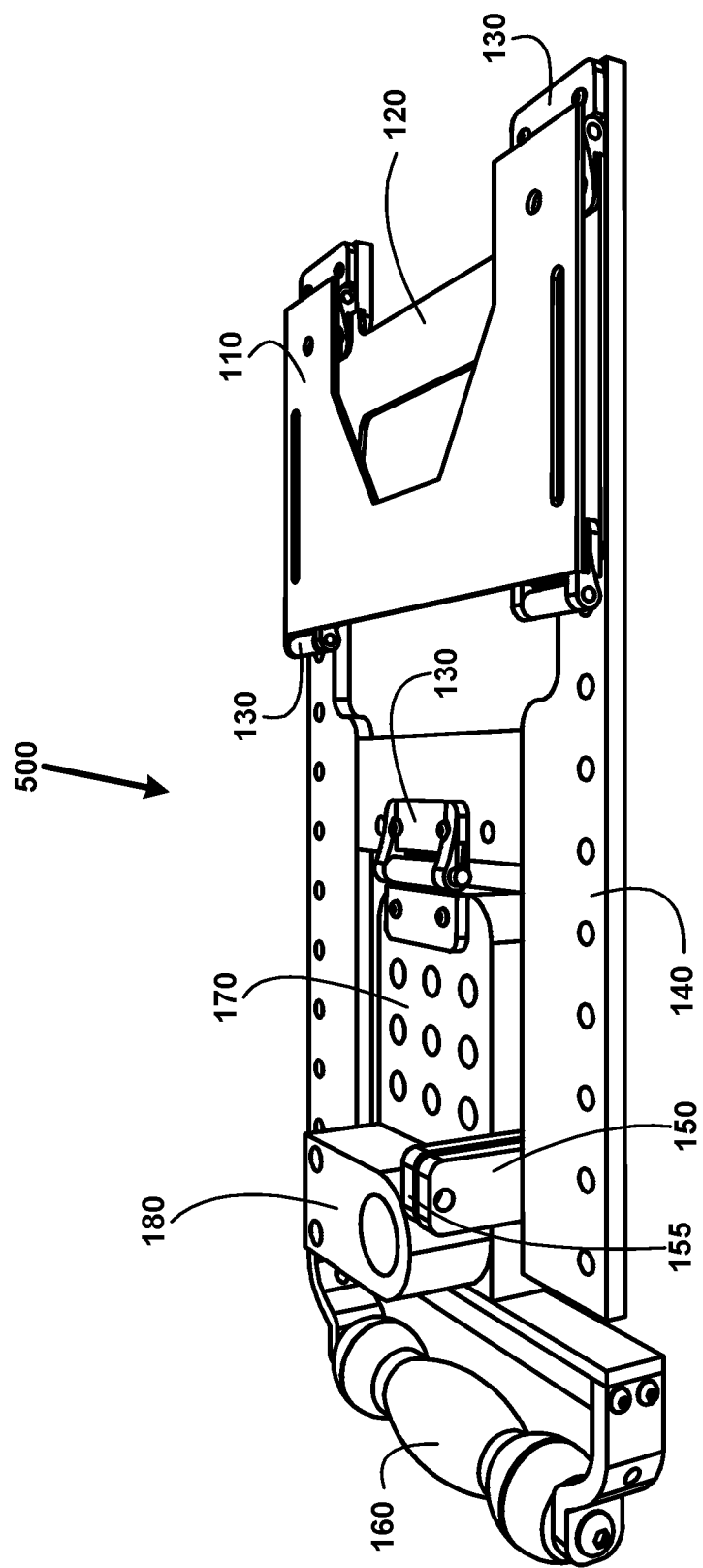
FIG. 5 shows for illustrative purposes only an example of mount bifold desktop appendage folded in stowed position of one embodiment.

FIG. 5 shows for illustrative purposes only an example of mount bifold desktop appendage folded in stowed position of one embodiment. FIG. 5 shows a mount bifold desktop appendage folded in stowed position 500. The fixed locking feature first embodiment 150, folding locking feature first embodiment 155, handle 160, folding appendage first embodiment 170 and mount receptacle appendage 180 are folded flat with the main body of the mount first embodiment 140. The bifold desktop free-standing mount 110 and bifold main body mount appendage 120 are folded into the stowed position using the constant torque hinge first embodiment 130 coupled to each other and the main body of the mount first embodiment 140 of one embodiment.

Mount Sub-Plate

Figure 6:
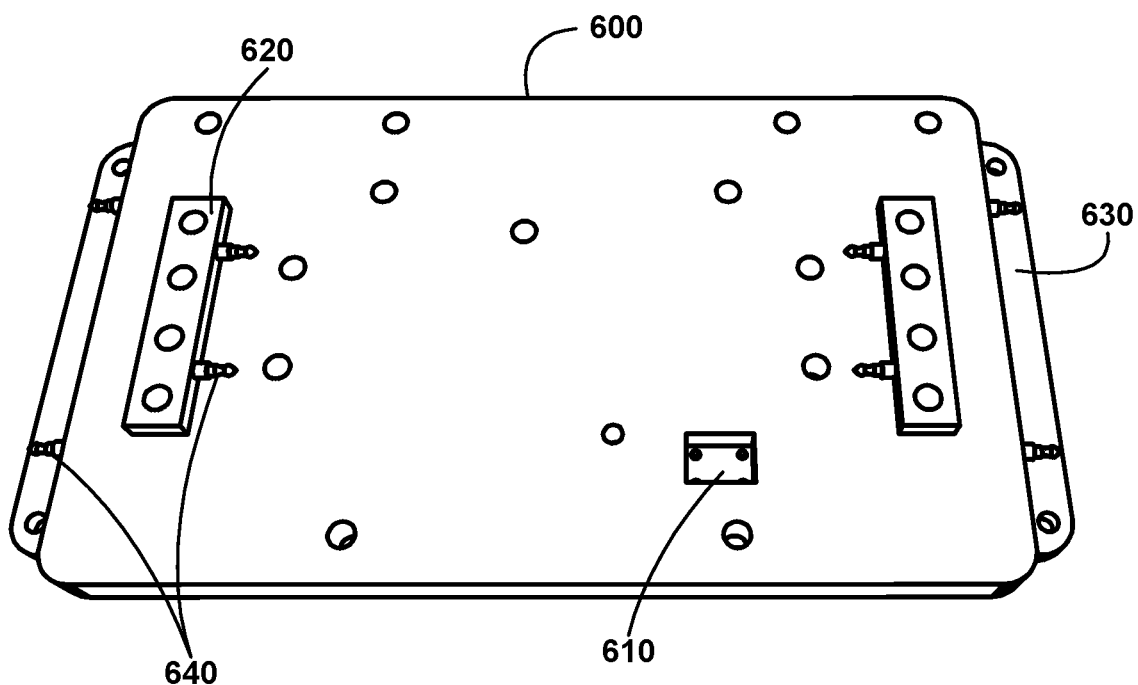
FIG. 6 shows for illustrative purposes only an example of mount sub-plate of one embodiment.

FIG. 6 shows for illustrative purposes only an example of mount sub-plate of one embodiment. FIG. 6 shows a mount sub-plate 600 including conductive pins or fiber optic connection 610 features including blocks 620 with embedded receptacles and embedded conductive pins 640. Both ends of the mount sub-plate 600 include an attachment flange 630 for coupling to for example the main body of the mount first embodiment 140 of FIG. 1 of one embodiment.

The mount sub-plate 600 allows power and/or electronic signals such as power, serial data, or fiber-optic light communications to pass from one plate to another via the mount sub-plate 600. This allows signals such as SDI video, HDMI video/audio, analog or AES audio, TCP/IP, analog video, DC power, AC power, or wireless signals to be powered via a mating connection from one plate to another. For other means of powering or signal transfer from one attached plate to another, or to the main body of the mount or any of its appendages, external connectors may be used to do this using conductive cabling or fiber optic cabling of one embodiment.

Electrical Components

Components which are electrical in nature as part of the mount, or integrated into the mount, may be composed of materials commonly used in computer circuit boards or other electronic substrates containing electric wiring or traces. This may also include fiber optics as it pertains to moving data within the mount. Other materials are materials used in the production of buttons, button labels, LEDs OLEDs, conductive traces and materials, Plasma, and others of one embodiment.

Battery Power

The mount sub-plate 600 can incorporate an attached battery to physically connect an external battery to the main body of the mount, or its appendages. The mount sub-plate 600 attached batteries can be used for carrying DC voltage and current onward to other devices for powering attached to the mount, mount sub-plate or other appendage plates and non-attached devices. An attached battery and an appropriate conducting cable may be used in conjunction with an electrical connector attached to the conducting cable. This allows the device(s) being used or attached on the mount sub-plate 600 to be powered solely from the power source (battery) which is attached to the mount sub-plate 600. The battery may utilize attached or built in electrical connections on the mount sub-plate 600 to deliver current into the main body of the mount through connections, or have wiring that extend out of the battery to be delivered elsewhere on the mount or its plates or sub-plates of one embodiment.

Batteries may include commercial batteries and consumer batteries, and batteries which are used on film and television production equipment for powering. Typically, this can be an Anton Bauer battery, V-mount battery, Sony NP or LP series, or other batteries, rechargeable or one-time-used, which are used to power monitors, cameras, or other devices associated with the use of this mount. The battery typically provides DC voltage and current at any level and capacity, but may include technology to include AC power at any voltage and current capability. The power supplied from the battery through the conductive wiring and appropriate power adaptor connector, can supply any voltage and current level required of the device to which the mount/plate to which it was designed to hold/power.

The battery plate itself may also serve as a source for electric power, depending on the type of plate being used, whether it has a built-in battery or not. The battery plate may also house adaptors or external plugs which source voltage and current from outside sources, such as an external power supply or solar device. Using the external plug, the battery can also be used as it was intended as would if a compatible battery were attached. The batteries attached to the mount sub-plate 600 may be rechargeable. In this case, a connector or means of charging the battery may be present. Through the mount sub-plate 600 the battery may be charged from other attached or independent (non-attached) battery or by means of an AC-DC or AC-AC adaptor using wall voltage of one embodiment.

Additionally, the mount sub-plate 600, including any of its contents or devices, may also be mounted by means of hanging from the handle, or handle section of the mount main body. The mount sub-plate 600 may include other extending pieces, permanent or telescoping or folding, and utilize hooks or latches or quick release methods in order to accomplish this task. Hanging the mount sub-plate 600 allows for the weight it would normally carry on the rear of a monitor or device to be instead be loaded onto the handle section and conversely onto the stand. This is particularly useful when a heavy battery is used that may otherwise add strain to the mount or its hinges. Further, the mount main body may contain one or more mounting slots to be able to hold multiple mount sub-plate 600 of various sizes. This will allow the mount to support many different accessories, on either side of the mount of one embodiment.

Constant Torque Hinge First Embodiment

Figure 7:
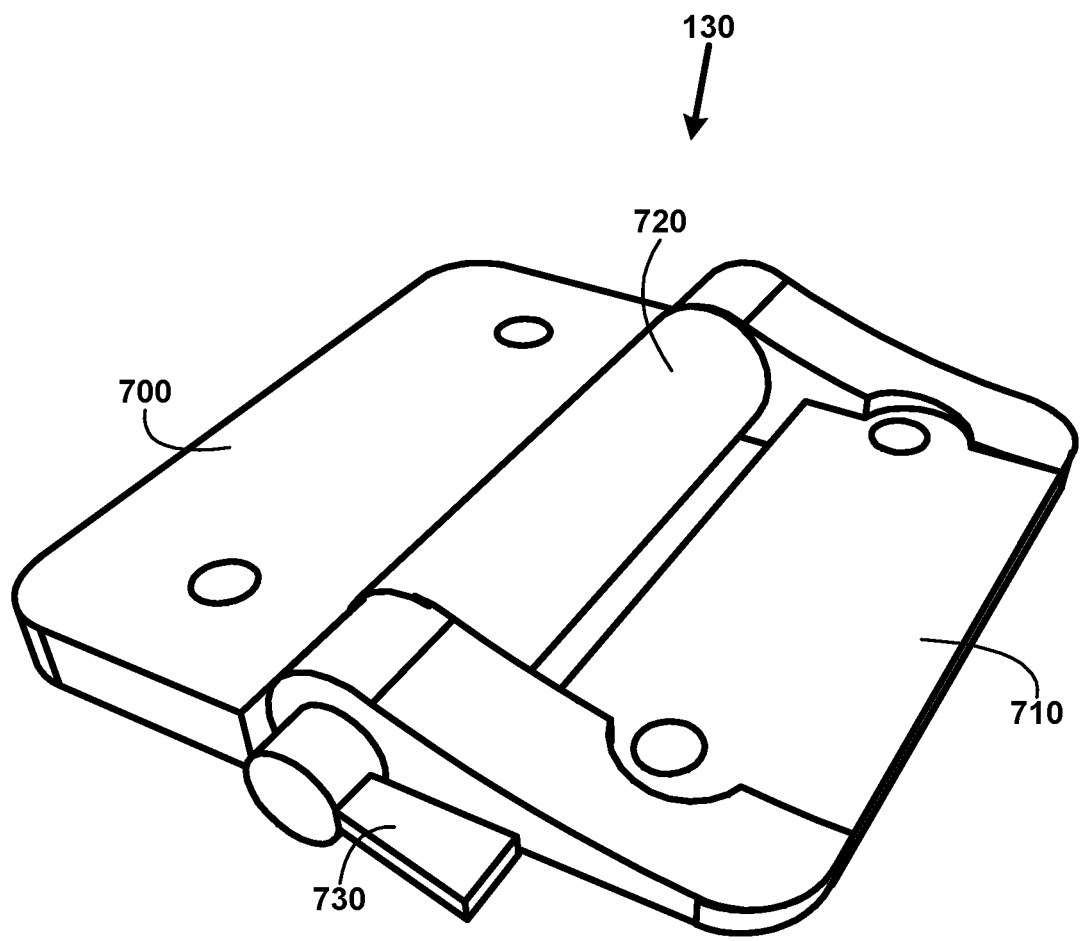
FIG. 7 shows for illustrative purposes only an example of constant torque hinge first embodiment of one embodiment.

FIG. 7 shows for illustrative purposes only an example of constant torque hinge first embodiment of one embodiment. FIG. 7 shows the constant torque hinge first embodiment 130 including a hinge attachment plate 700, hinge pin receptacle attachment plate 710, hinge pin receptacle 720 and an associated switch, button or lever 730. The friction in the hinges will be suited to the maximum payload specified on the mount's technical specifications for the device(s) and suspending or holding power needed in which it was designed to be used. With the use of constant torque hinges, the mount main body, or mount main body with its sub-plates, may fold onto itself for compact storing using any predetermined friction amount, having the ability to stay in its stowed position. The constant torque hinges allow the handles and its associated plates and mounting holes and brackets to remain in the place where it was moved by the operator of one embodiment.

When deployed away from the monitor, the constant torque hinges may allow the handles and its associated plates to be positioned not only in one direction, but also from front to back, side-to-side, up and down, as well as in polarization to the position desired by the operator, depending on the constant torque hinge used. If a self-supporting desktop mount plate combination is used, the plates can be hinged in such a way as to support the entire monitor and mount to be physically supported on a desktop or flat surface, or be used in other mounting options, such as a wall mount or by using other mounts of one embodiment.

Constant Torque Hinge Movement with Plates and Handles

Constant torque hinges are those which have a certain amount of resistive force in order to move them. The actual resistive portion of the hinge is what gives the friction, so when the term "constant torque hinge" is used, this is to be assumed. The actual "hinge" may simply be composed of this resistive mechanism, normally embedded within other pieces and with mounting holes present, and may be built in as part of the plates or other integrated pieces within the mount. The range of friction can range from 0.01 ft-fbs and on upward to a predetermined resistive amount in ft-lbs of one embodiment.

The plates or handle structures as described using the constant torque hinges will stay at the near-exact angular position to which they are moved, assuming the combined force applied to continuously stays at less than the rating of the hinge. If more than one hinge is supporting a single plate or handle or handle structure, the combined force on that structure or plate, such that it is less than the combined force of the constant torque hinge ratings, will hold its position given the constant torque hinge is designed to have friction throughout its entire range. If the hinge is meant to have only partial resistance, for example in one direction over another, the stronger resistance will support the force applied to it, so as long as the device is used under the recommended guidelines for practical use. The constant torque hinges may allow for a free-range of motion up to 360 degrees of angular movement. However, with additional restrictions of movements within the constant torque hinge itself or other stops or limiting materials, incorporated into the mount, the actual moveable range may be less than this. Utilizing stops or latches or other such impeding objects, the hinge angular movement may be restricted to a predetermined range of angular movement of one embodiment.

Constant Torque Hinges Composition

Constant torque hinges can be composed of various materials including for example aluminum, steel, stainless steel and other metals such as potted metal or zinc, plastics, compounds, fabrics, fiberglass, plexiglass, various varieties of wood, or other substrates including materials used in off-the-shelf hinges, sub-plates and the mount of one embodiment.

Free-Movement/Constant Torque Hinge Combo

The mount may utilize a constant torque hinge or hinges that incorporate a dual-functionality in one hinge assembly: Free-moving and friction. The constant torque hinge can utilize an engaging or disengaging switch, button or lever that allows it to switch between being a loose, free moving hinge to a friction-type hinge, and vice versa. This function may be built into the hinge or used as an external function. When the associated switch, button or lever is pushed, pulled, or moved side-to-side either by hand or an associated mechanical or electronic device while the hinge is in free-movement mode, the hinge provides friction to the hinge junction and ceases to be free-moving. This mechanism may be spring loaded, compression locked or other method. The same applied for the reverse of this function. In this way, an otherwise full-constant torque hinge will be able to be moved without effort at the angular position desired, at which position it can be manipulated to operate with friction. The same applies when it sits in the friction position: the hinge can be freed from having friction and can be moved without effort to a new angular position of one embodiment.

Adjustment of Friction on the Hinge(s)

Additionally, the hinges, if they are fully friction or a free-movement/friction combo, may include a method to manually adjust the amount of friction, either directly by a mechanical lever or rotational method, or electronically. The friction amount may be from 0.01 ft-lbs on upward to the highest friction amount of the internal hinge mechanism. The hinge may have an associated knob to accomplish this task, or may have an electrical interface to vary it within a given range. This allows an adjustable force on the hinge mechanism, in pre-determined steps, or in a fluid manner. These hinges may also include additional gear, mechanisms, or electronics to accomplish this task of one embodiment.

Sliding Mechanism on Mount Main Body

The constant torque hinge first embodiment 130 for example and its associated hinge and hinge support(s) may be able to be adjusted up and down along main body of the mount first embodiment 140 of FIG. 1 and locked in place. This may include clamps or other locking methods to keep it in place. The purpose is to be able to adjust the vertical height of the constant torque hinge to compensate for the physical mounting needs and center of gravity adjustment of the monitor or other device which it is attached to of one embodiment.

AC/DC Switching Supply

Figure 8:
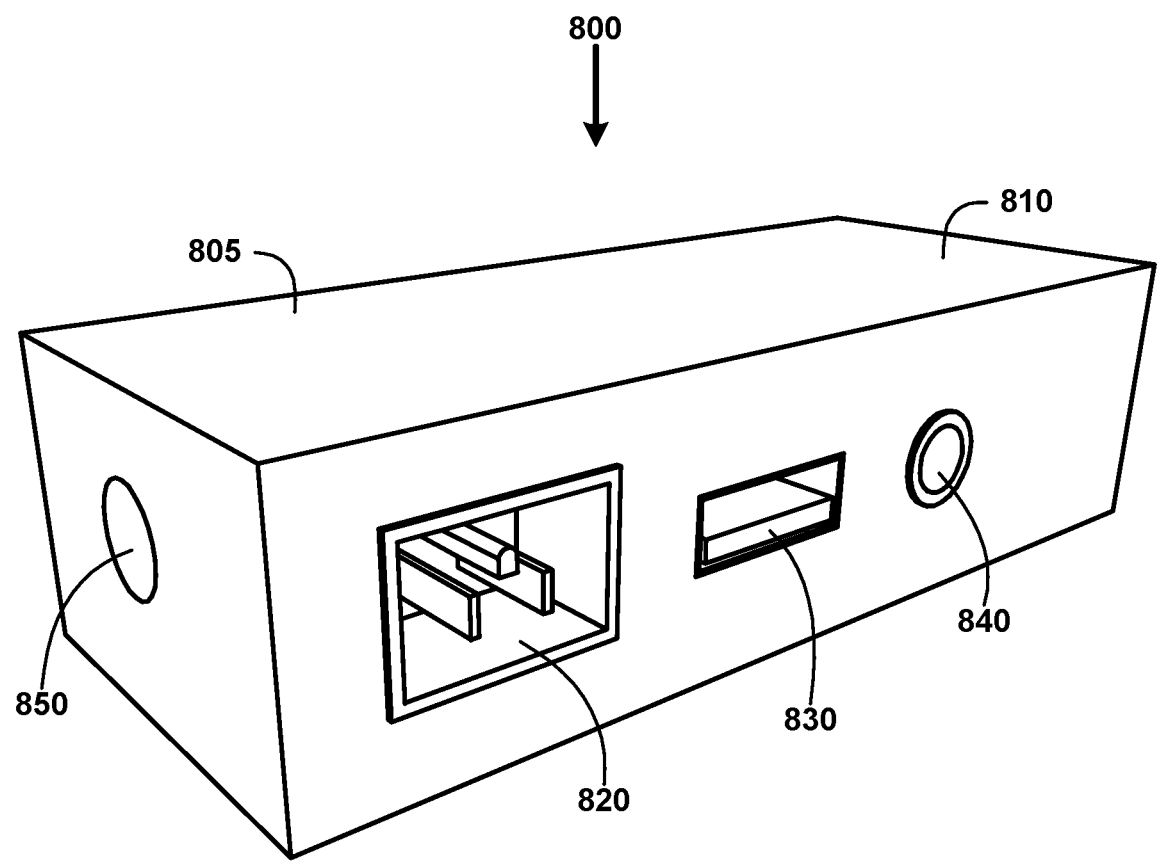
FIG. 8 shows for illustrative purposes only an example of ac/dc switching supply of one embodiment.

FIG. 8 shows for illustrative purposes only an example of ac/dc switching supply of one embodiment. FIG. 8 shows an AC/DC switching supply device 800 with AC/DC switching inside 805 not shown. An AC/DC switching supply case 810 includes AC input 820, USB power out SVDE 830, DC output 12 VDC 840 and internal connector to sub-plate 850 for inserting a DC output connector or cable jack. The AC/DC switching supply device 800 can be coupled to the mount sub-plate 600 of FIG. 6. The AC/DC switching supply device 800 coupled to the mount sub-plate 600 of FIG. 6 can provide functions including switching AC to DC supply, DC to DC supply, or AC to AC converter, with one or more voltage output(s) to power the monitor or other on board, or external devices requiring power using the supply.

The housing for the power supply may include connectors or fittings tailored for use on the sub-plate, or are situated on one side using connectors. Switching power desktop supplies, is commonly used for powering monitors and can have connections on either end. The AC/DC switching inside 805 can include electronics all wired such that they can either be connected into the mount sub-plate 600 of FIG. 6, or on any side of the AC/DC switching supply case 810 designed to provide a particular switching supply application. For example an incoming AC signal connection as well as a DC jack or cable from that supply can be positioned through the bottom side of the AC/DC switching supply case 810 to accommodate cable management for a particular mounted monitor or other device.

Additionally, the AC/DC switching supply device 800 may include multiple output DC signals and connectors including for example 5 VDC to provide multiple USB jack(s) power points or to provide voltage into the sub-plate and in turn into the mount main body of one embodiment.

Side Mounted Plate

Figure 9A:
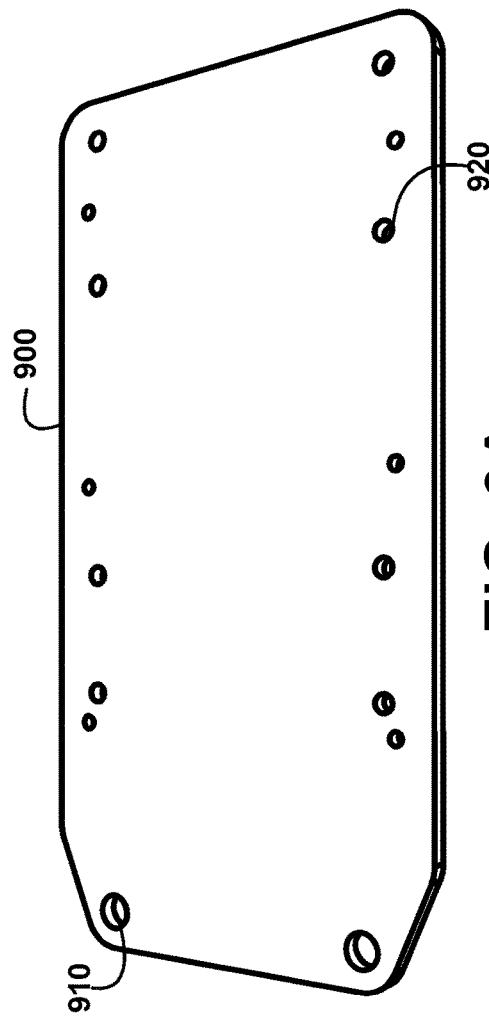
FIG. 9A shows for illustrative purposes only an example of side mounted plate of one embodiment.

FIG. 9A shows for illustrative purposes only an example of side mounted plate of one embodiment. FIG. 9A shows a side mounted plate 900 that can for example be coupled to the main body of the mount first embodiment 140 of FIG. 1. The side mounted plate 900 includes side mounted plate attachment bolt holes 910 and side mounted plate other equipment attachment holes 920. The side mounted plate 900 can be attached to the main body of the mount on either side, left or right, or on the front surface, or rear front portion of the main body of the mount. The side mounted plate 900 can be composed of various materials including for example aluminum, steel, stainless steel and other metals such as potted metal or zinc, plastics, compounds, fabrics, fiberglass, plexiglass, various varieties of wood, or other substrates. Batteries, electronic equipment, the AC/DC switching supply device 800, other mounts and devices can be coupled to the side mounted plate 900.

The side mounted plate attachment bolt holes 910 and side mounted plate other equipment attachment holes 920 may be tapped or non-tapped holes to utilize screws for attaching, including metric or standard, captive screws. Blocks or other shapes along with mating connectors or mounting holes to accommodate the attachment of electronic equipment or additional mounts or appendages to the mount can be coupled to the side mounted plate 900. Other attachment devices for use with the side mounted plate 900 to the main body of the mount may include latches, magnetic latches, press-fittings, or may be held in place by electrical connectors or latching of any number of conductive pins or fiber optic connections.

The side mounted plate 900 may contain electronic functions, including the integration or housing of electronic power supplies, DC-DC-converters, power generators or third-party electronic equipment such as SDI to HDMI converters, and other converters that change one electronic format to another. The side mounted plate 900 may incorporate, in its attachment to another plate, mating power connections capable of carrying voltage and current to either plate from other plates integrated within the bracing technique.

Mounting holes in the mount, sub-mount(s) including the side mounted plate 900 and bifold plates may include a wide variety of holes and/or slots going through the plates for mounting other electronic/physical or mounting equipment or gear. The attachment devices can include hardware or tie wraps, string, and other attachment devices. The mounting holes may include a wide variety of tapped holes going through the plates as well to accomplish this same task, including metric, standard or other non-standard taps, or may be through holes of any size or shape. The size of the any of these holes is not limited other than impeding physical restrictions on the mount. Any of these holes may or may not go through the material entirely and may be partially-bored holes and may also include extruding pieces that have these mounting holes.

The side plate may include slotted or elongated holes (940) to accommodate straps to hold equipment or other mounts onto the plate, such as Velcro nylon detachable fastener hook loop tie cable straps or Velcro tie-downs or elastic bands. Using this method, the plates may accommodate desktop power supplies or other equipment or other mounts by using the holes as a tie point to securely hold equipment down onto the side plate.

Side Plate Third Party Accommodation

The side plate mounting holes on the main mount may be designed as to accommodate other third party plates or battery mounts, or other mounts or hardware to be able to mount to it. The main body mount may include notches, grooves or contours and cutouts to accomplish this task, as well as having differing sizes of tapped or through holes, latches, pins, or screws in order that the third party hardware may require to be affixed. Electronic or other signal connections may be moved or added on the mount to accommodate third party plates or fixtures. They may include connections common to the third party plate(s) configuration and power/signal requirements, or data transmission/receiving protocols for communications

Side Plate with Constant Torque Hinges

Figure 9B:
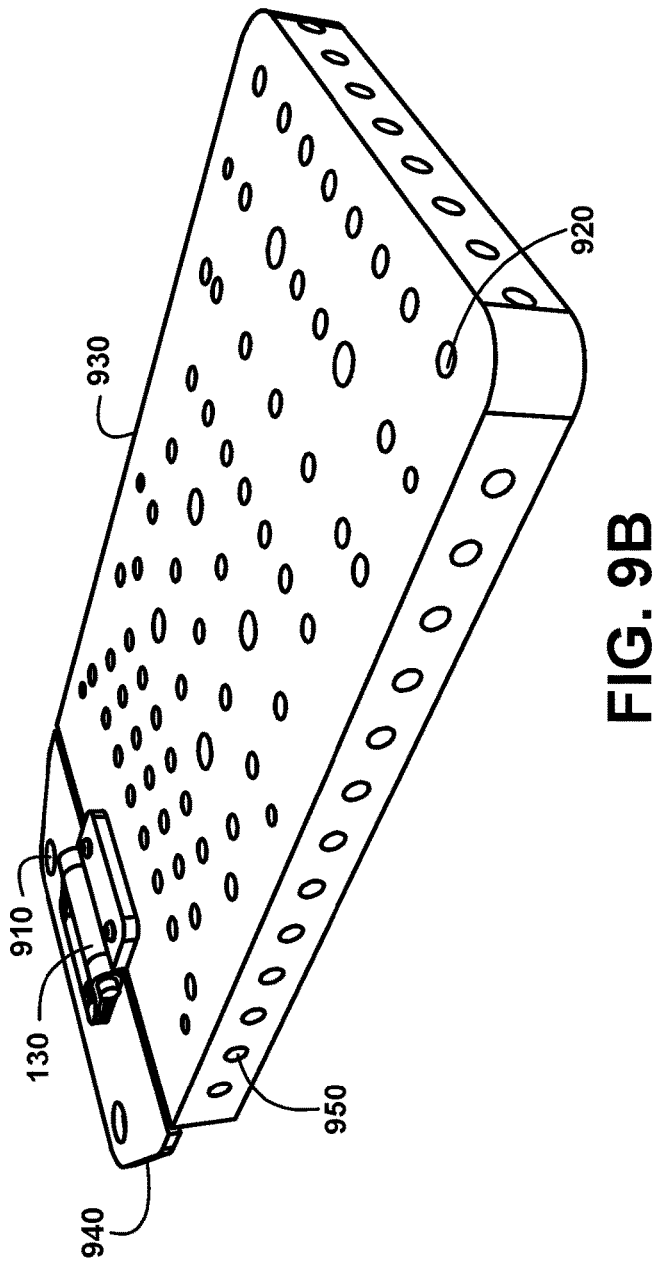
FIG. 9B shows for illustrative purposes only an example of a hinged side mounted plate of one embodiment.

FIG. 9B shows for illustrative purposes only an example of a hinged side mounted plate of one embodiment. FIG. 9B shows a side plate with at least one constant torque hinge. The hinged side mounted plate 930 may use one or more constant torque hinges 130 as part of the plate design. In addition to the main plate itself, it may use additional pieces to accommodate the use of hinges. It may contain electronic and signal connectors to pass power or data to and from these separated pieces. With the use of hinges on the side plate, the hinged side mounted plate 930 will allow the side plate to swivel and stay in any angular position while attached at any location on the mount. It may be able to do this while a battery plate, holder, or any other device is attached to it, along with any attached batteries are present on the battery plate, or other mounts, power supplies, and other attachments are attached to the plate.

The plate will be able to swing up to 360 degrees and be mounted in any configuration to the main body mount, or if used on other mounts outside of this invention. The ability to swing the plate on its hinge is particularly useful when space is limited around the mount, or when a connector, button, screen, lights, mounting holes or other useful areas of the rear of the monitor or device it is attached to cannot be accessed if a standard, non-hinges mounted side plate is used in that portion of the mount and monitor or device. The constant torque hinges will hold the plate utilizing them to hold firmly at any position.

The hinged side mounted plate 930 may be able to house other mounts or fixtures, including third-party, on either side of the plate. This may include V-mounts, 15 mm round rod holders/clamps, battery plates, or other mounts or pieces designed to hold electronic equipment or antennas. Either side, including both simultaneously, may be used for such purposes. The hinged side mounted plate mount section 940 attachment bolt holes 910 and side mounted plate other equipment attachment holes 920 may be tapped or non-tapped holes to utilize screws for attaching, including metric or standard, captive screws.

Mounting Holes in Side Plate

The side plate, or side plate with a friction hinge, may also contain mounting holes 950 built in to it, such as tapped ¼-20 holes as to allow other mounts, equipment or screws to attach to it. The side plate may be milled or formed from a thicker material which can permit these holes to exist as part of the plate itself, or additional pieces with mounting holes 950 can be added to accomplish this. The pattern of holes may be that of a "cheese plate" pattern as commonly used in mounts for professional television and film gear and as found on the main body mount. These holes may be present on the top of the side plate, in the front of it, or rear of it, or on the bottom of it. They may also be present on either side of it. The holes may be angled at any degree.

Rod Holder(s) in Side Plate

One or more rod holders or rod clamps may be implemented into the design as well, which would either be molded or milled into the side plate, or a third party holder or additional pieces can be attached by screws or other methods onto the plate structure. A typical 15 mm round rod (typically used for camera handles, rails, and DSLR rigs, and for other mounts) can be attached onto the side plate. Other rod types may be used with appropriate changes to the mounting structure. This would allow the side plate to be used to hold equipment or other mounting hardware from the side plate itself with the use of the rods. If it is used on the side plate with friction hinge it would allow for varying positioning of the items mounted to it. Aside from the use of a friction hinge, the plate may be able to be flipped front to back, and vice versa similarly to that of the movement of LCD screens on the sides of video cameras or camcorders.

This would be accomplished by a rotational pivoting hinge. It would allow a camera plate, for example, to face up and away from the monitor (or towards the mount), or to face toward the monitor (or away from the mount), giving more flexibility as to which direction a battery or piece of equipment is facing while mounted onto the side plate. The side plate with friction hinge may have electronics built in to it, such as and LCD or LED screens, or wireless capability for example. It may hold the same capabilities as the side plate without the use of a friction hinge(s).

Monitor Mount with Constant Torque Hinges Second Embodiment

Figure 10:
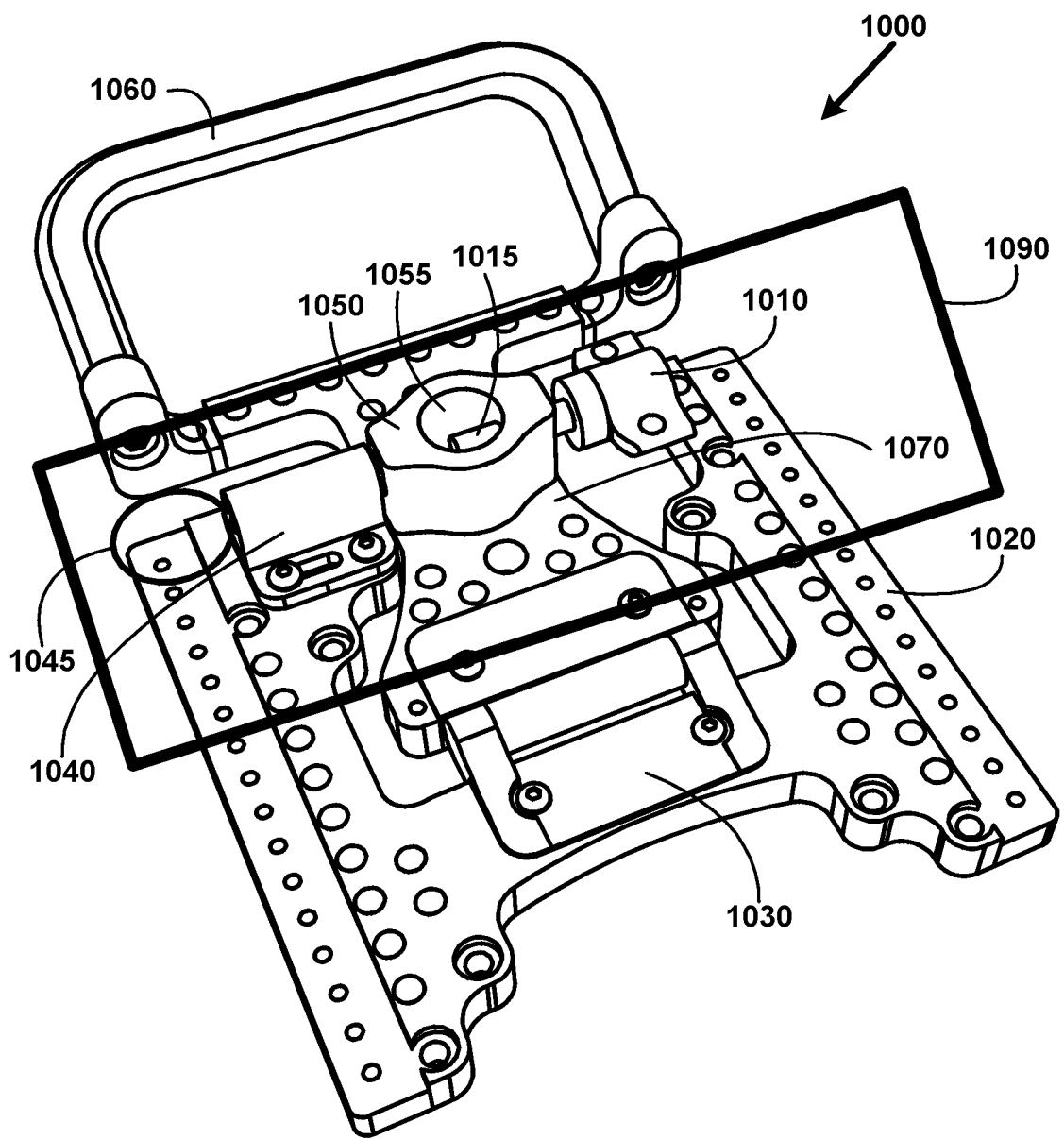
FIG. 10 shows for illustrative purposes only an example of monitor mount with constant torque hinges second embodiment of one embodiment.

FIG. 10 shows for illustrative purposes only an example of monitor mount with constant torque hinges second embodiment of one embodiment. FIG. 10 shows a monitor mount with constant torque hinges second embodiment 1000. The monitor mount with constant torque hinges second embodiment 1000 includes a pipe mounting receptacle securing tab 1010, pipe mounting receptacle securing threaded bolt 1015, mount receptacle appendage second embodiment 1050 and a pipe mounting receptacle second embodiment 1055. A main body of the mount second embodiment 1020 includes a constant torque hinge second embodiment 1030 coupled to a folding appendage second embodiment 1070 with an angled handle 1060.

Figure 12A:
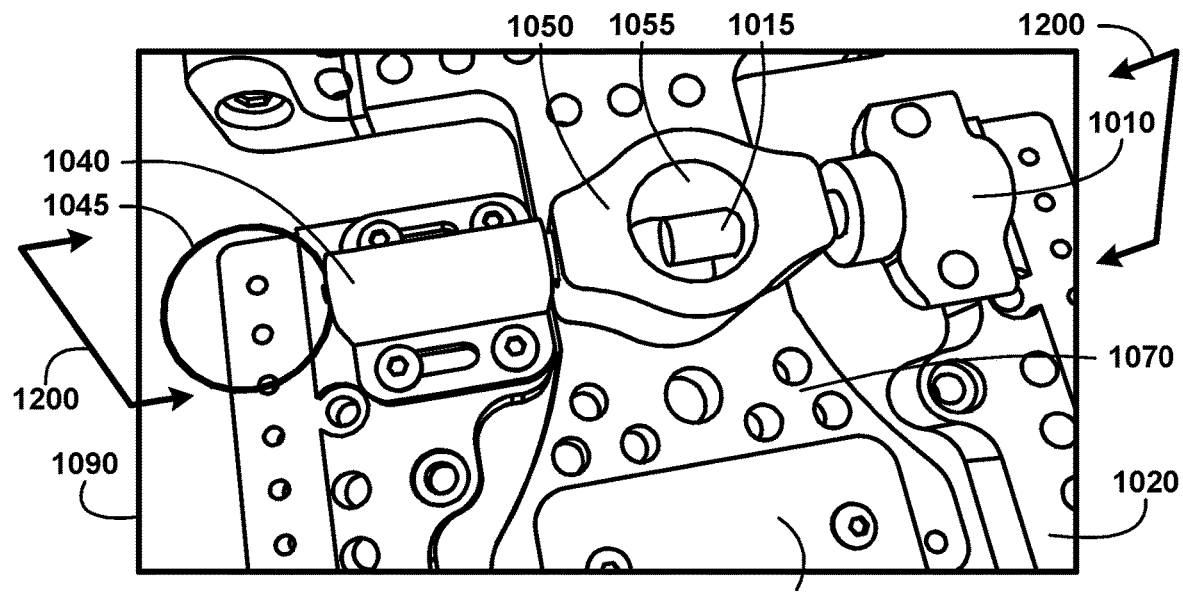
FIG. 12A shows for illustrative purposes only an example of mount receptacle appendage of one embodiment.

The main body of the mount second embodiment 1020 includes a fixed locking feature second embodiment 1040 with a fixed locking feature pull ring 1045. Additional descriptions of the fixed locking feature second embodiment 1040 and mount receptacle appendage second embodiment 1050 as indicated in Detail "A" 1090 are shown in FIGS. 12A, B and C of one embodiment.

Latch

Latch 1040 may be that of a lockout or non-lockout type, and can be of any size and of any style, including a knob-type of pull. It can be mounted onto the mount from underneath or from the top, or the sides. Its spring tension can be any ft-lbs of strength, or it may not contain any springs whatsoever.

Monitor Mount with Constant Torque Hinges Third Embodiment

Figure 11:
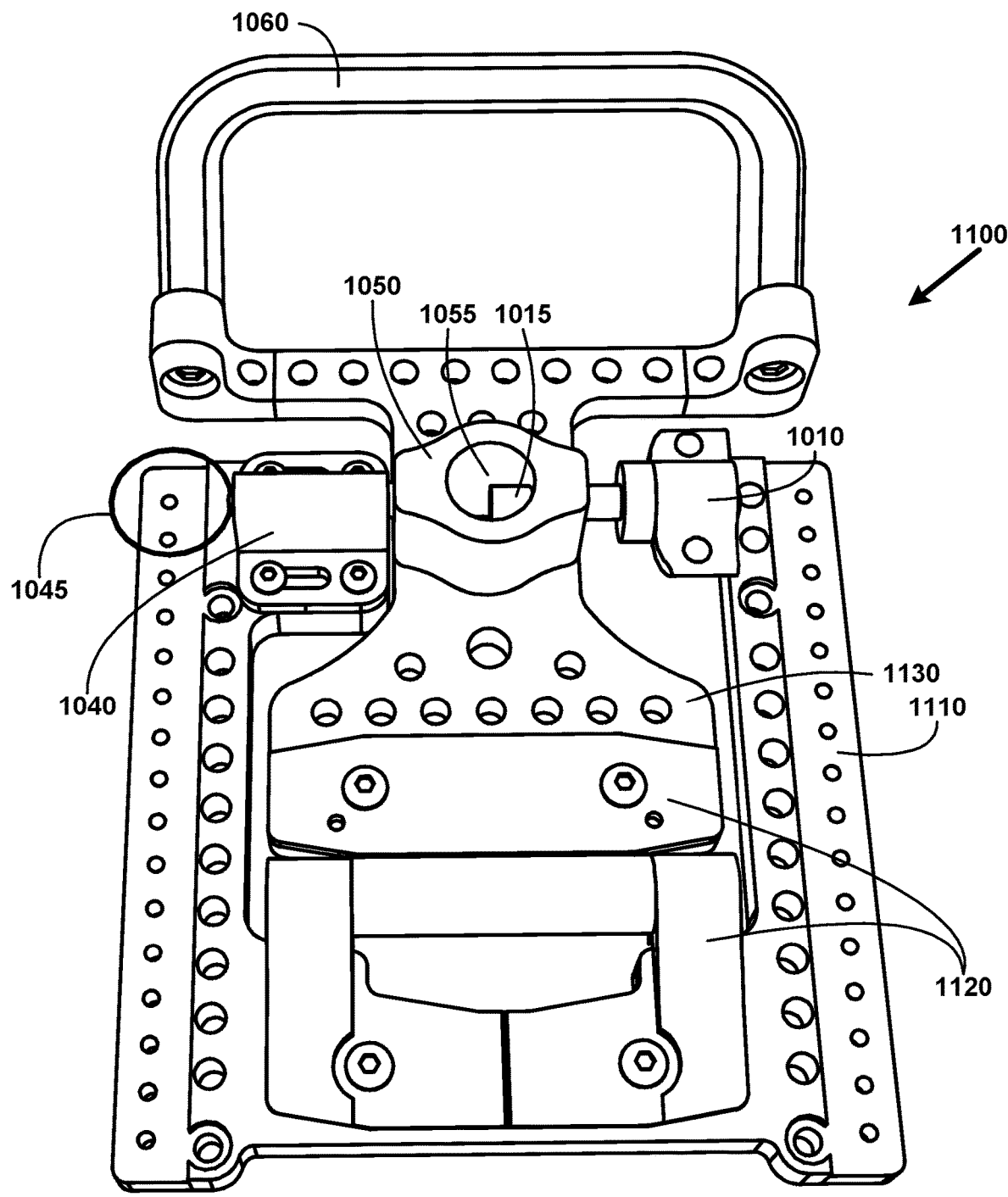
FIG. 11 shows for illustrative purposes only an example of monitor mount with constant torque hinges third embodiment of one embodiment.

FIG. 11 shows for illustrative purposes only an example of monitor mount with constant torque hinges third embodiment of one embodiment. FIG. 11 shows a monitor mount with constant torque hinges third embodiment 1100. FIG. 11 shows the pipe mounting receptacle securing tab 1010, pipe mounting receptacle securing threaded bolt 1015, fixed locking feature second embodiment 1040, fixed locking feature pull ring 1045, mount receptacle appendage second embodiment 1050, pipe mounting receptacle second embodiment 1055, and angled handle 1060. The monitor mount with constant torque hinges third embodiment 1100 includes a main body of the mount third embodiment 1110, constant torque hinge third embodiment 1120 and folding appendage third embodiment 1130 of one embodiment.

Auto Latch to Main Body Mount Description

The handle of the mount along with peace 1130 and its components may be designed that when it is pushed into a stowed position, the lock 1040 will latch into place on its own without having to manually lock it. This will be accomplished by a present angular cutout on the bottom of 1130, which will allow gradual retraction (pushing in) of a spring-loaded mechanism of the lock as the mount moves in towards a stowed position, until it meets the hole in 1150, at which point releases and latches 1130 into a locked and stowed position. Unlocking the latch would require the manual releasing of the pin from 1050.

Mount Receptacle Appendage

FIG. 12A shows for illustrative purposes only an example of mount receptacle appendage of one embodiment. FIG. 12A shows Detail "A" 1090 which includes the pipe mounting receptacle securing tab 1010, pipe mounting receptacle securing threaded bolt 1015, fixed locking feature second embodiment 1040, fixed locking feature pull ring 1045, mount receptacle appendage second embodiment 1050, pipe mounting receptacle second embodiment 1055, main body of the mount second embodiment 1020, constant torque hinge second embodiment 1030 and folding appendage second embodiment 1070. FIG. 12A also shows a cross section indicator 1200 for further description of the operation of fixed locking feature second embodiment 1040 and mount receptacle appendage second embodiment 1050 as shown in FIG. 12B and FIG. 12C of one embodiment.

Turning to Secure External Mounting Rod

Figure 12B:
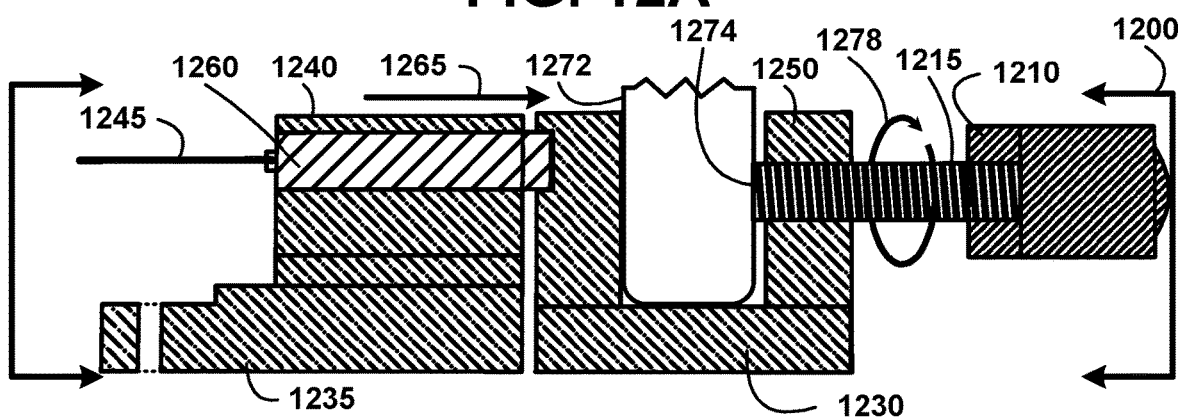
FIG. 12B shows for illustrative purposes only an example of turning to secure external mounting rod of one embodiment.
Figure 12C:
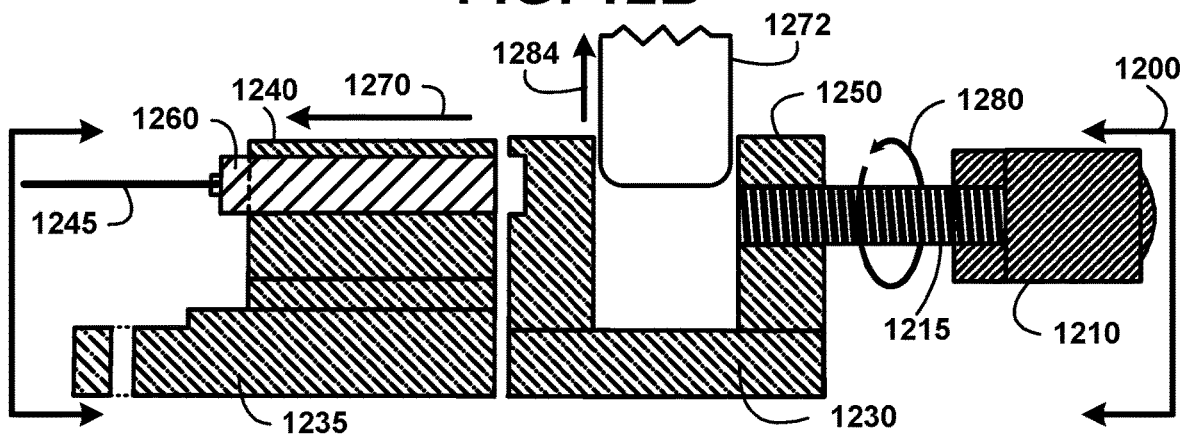
FIG. 12C shows for illustrative purposes only an example of pulling retractable pin to unlocked position of one embodiment.

FIG. 12B shows for illustrative purposes only an example of turning to secure external mounting rod of one embodiment. FIG. 12B shows the cross section indicator 1200. FIG. 12B shows a folding appendage second embodiment cross section 1230 with a mount receptacle appendage second embodiment cross section 1250 coupled. Also showing is an external mounting rod cross section 1272 inserted into the mount receptacle. Shown is pipe mounting receptacle securing tab cross section 1210 used for turning to secure external mounting rod 1278 a pipe mounting receptacle securing threaded bolt cross section 1215. After securing threaded bolt against a mounting rod 1274 the mounting rod is held in place of one embodiment.

A main body of the mount second embodiment cross section 1235 shows a fixed locking feature second embodiment cross section 1240 coupled. The fixed locking feature second embodiment cross section 1240 includes a locking bolt cross section 1260 with a fixed locking feature pull ring cross section 1245 attached. An operation pushing locking bolt to locked position 1265 into a partial hole of the mount receptacle appendage second embodiment cross section 1250 locks the folding appendage second embodiment cross section 1230 into a stowed position of one embodiment.

Pulling Retractable Pin to Unlocked Position

FIG. 12C shows for illustrative purposes only an example of pulling retractable pin to unlocked position of one embodiment. FIG. 12C shows the folding appendage second embodiment cross section 1230 with the mount receptacle appendage second embodiment cross section 1250 according to the cross section indicator 1200. The pipe mounting receptacle securing tab cross section 1210 is turning to retract 1280 the pipe mounting receptacle securing threaded bolt cross section 1215 and release the external mounting rod cross section 1272. An operation is performed for removing external mounting rod cross section 1284 of one embodiment.

The main body of the mount second embodiment cross section 1235 shows the fixed locking feature second embodiment cross section 1240 coupled. An operation is performed using the fixed locking feature pull ring cross section 1245 for pulling retractable pin to unlocked position 1270. The locking bolt cross section 1260 in the unlocked position allows the folding appendage second embodiment cross section 1230 to be moved to an angular position of one embodiment.

High Definition Televisions/Monitors

Figure 13:
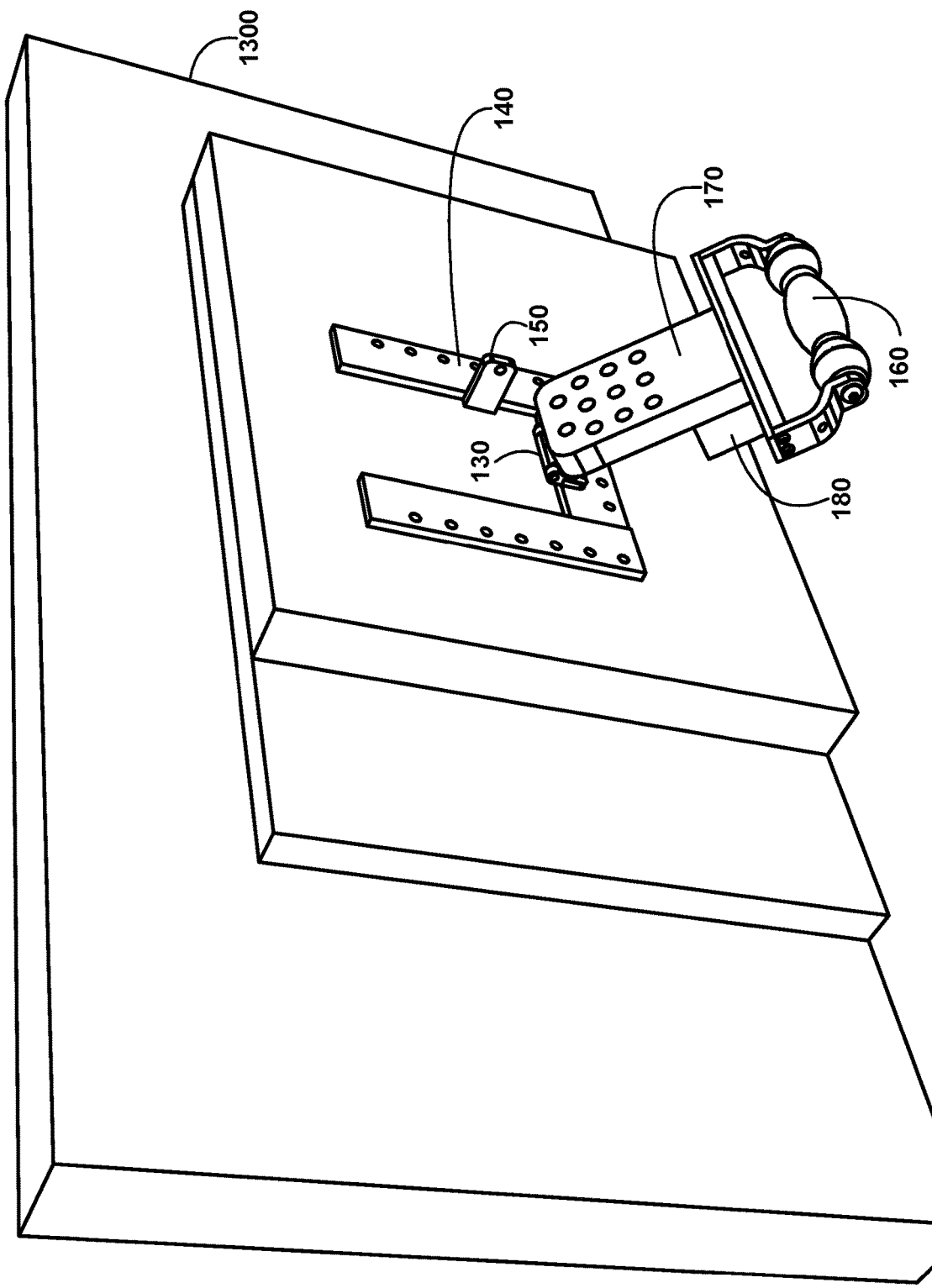
FIG. 13 shows for illustrative purposes only an example of high definition televisions/monitors of one embodiment.

FIG. 13 shows for illustrative purposes only an example of high definition televisions/monitors of one embodiment. FIG. 13 shows the main body of the mount first embodiment 140 with the fixed locking feature first embodiment 150 is coupled to for example a high definition monitor 1300. The folding appendage first embodiment 170 includes the coupled mount receptacle appendage first embodiment 180 and coupled handle 160. The handle 160 has been pulled down to an angular position using the constant torque hinge first embodiment 130 to support the high definition televisions/monitors 1300 at a desired angle of one embodiment.

Left Side Positioned Side Mounted Plate Attachment

Figure 14:
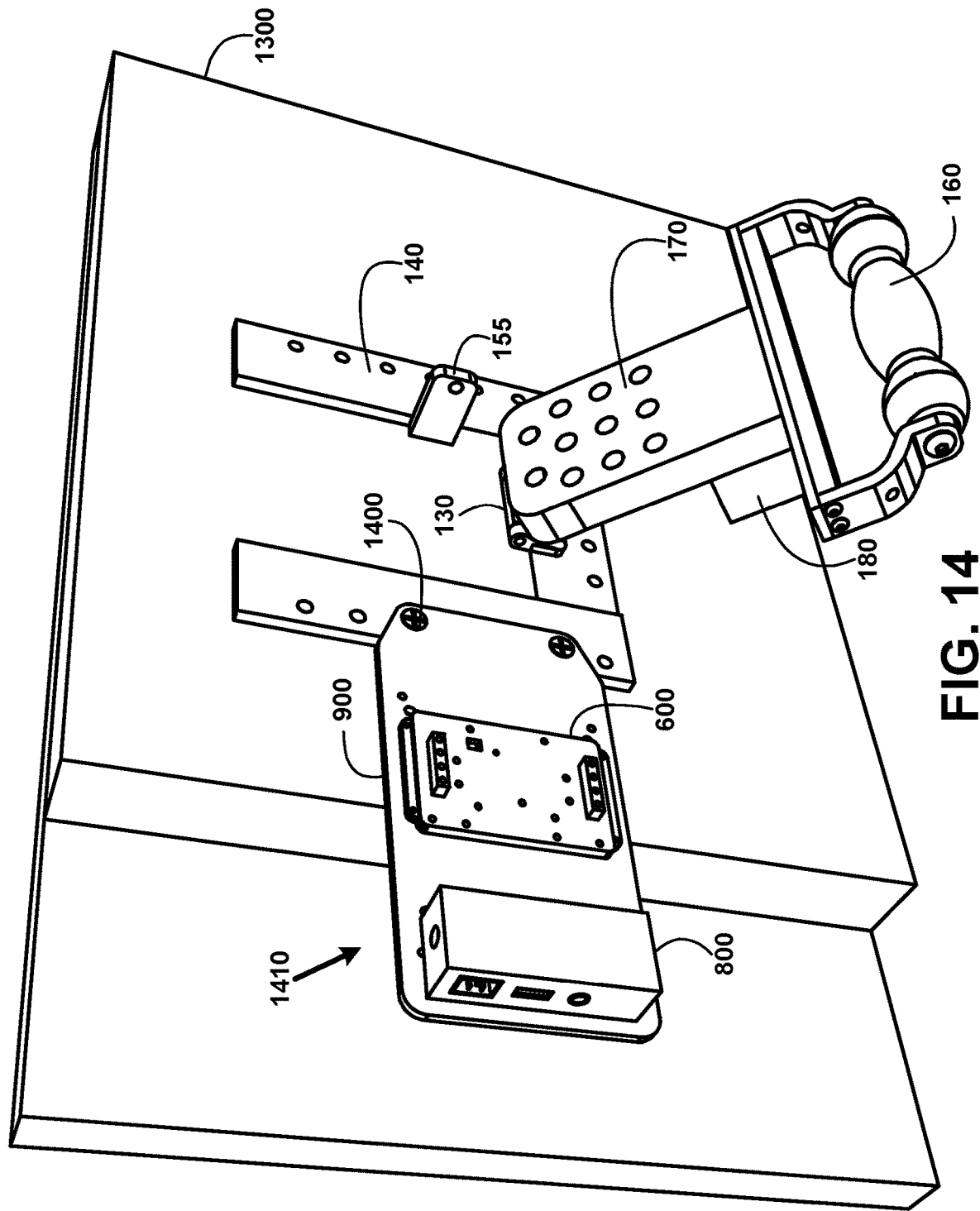
FIG. 14 shows for illustrative purposes only an example of left side positioned side mounted plate attachment of one embodiment.

FIG. 14 shows for illustrative purposes only an example of left side positioned side mounted plate attachment of one embodiment. FIG. 14 shows the main body of the mount first embodiment 140 with the fixed locking feature first embodiment 150 is coupled to for example a high definition monitor 1300. The folding appendage first embodiment 170 includes the coupled mount receptacle appendage first embodiment 180 and coupled handle 160. The handle 160 has been pulled down to an angular position using the constant torque hinge first embodiment 130 to support the high definition monitor 1300 at a desired angle. Attached to the main body of the mount first embodiment 140 is a left side positioned side mounted plate attachment 1410. The side mounted plate 900 is coupled to the main body of the mount first embodiment 140 using two of a side mounted plate attachment screw 1400. Coupled to the side mounted plate 900 is the mount sub-plate 600 and AC/DC switching supply 800 of one embodiment.

Right Side Positioned Side Mounted Plate Attachment

Figure 15:
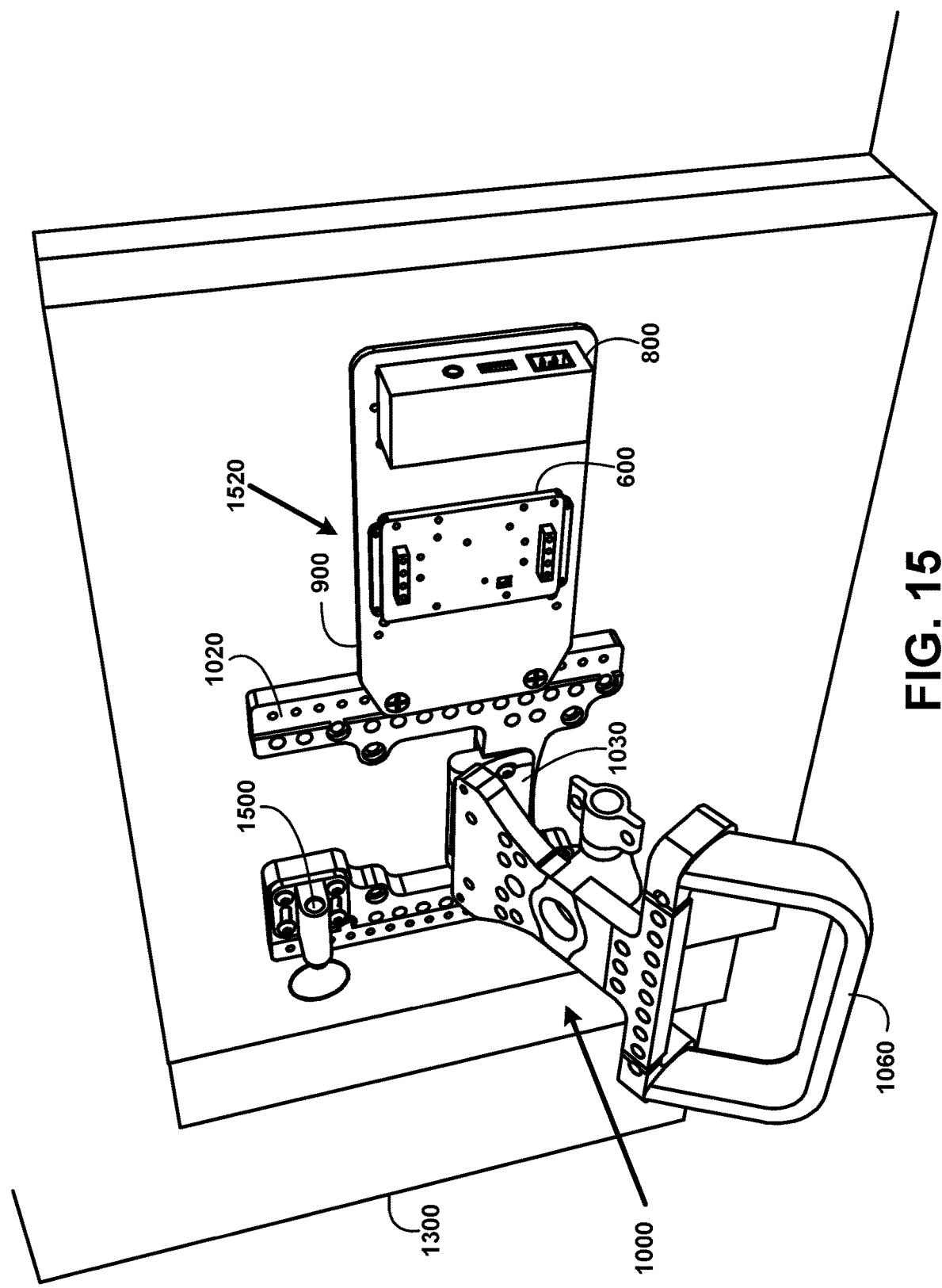
FIG. 15 shows for illustrative purposes only an example of right side positioned side mounted plate attachment of one embodiment.

FIG. 15 shows for illustrative purposes only an example of right side positioned side mounted plate attachment of one embodiment. FIG. 15 shows the monitor mount with constant torque hinges second embodiment 1000 coupled to the high definition monitor 1300. A locking bolt 1500 is in an unlocked position. The angled handle 1060 has been pulled down using the constant torque hinge second embodiment 1030 to a desired angular position to support the high definition monitor 1300. FIG. 15 shows a right side positioned side mounted plate attachment 1520 coupled to the main body of the mount second embodiment 1020. The side mounted plate 900 has attached the mount sub-plate 600 and AC/DC switching supply 800. The mount sub-plate 600 can be mounted on the side mounted plate 900 as shown in FIG. 15 and can be mounted separately as shown in FIG. 19B. The AC/DC switching supply 800 can be made in various sizes and can be mounted on the side mounted plate 900 for example by itself in a larger sized embodiment of one embodiment.

Sub-Panel Mount Attachment

FIG. 16 shows for illustrative purposes only an example of a sub-panel mounted on a folding appendage first embodiment one embodiment. FIG. 16 shows the monitor mount with constant torque hinges third embodiment 1100 coupled to the high definition monitor 1300. The locking bolt 1500 is in an unlocked position. The angled handle 1060 using the constant torque hinge third embodiment 1120 has been pulled down to a desired angular position to support the high definition monitor 1300.

FIG. 16 shows the mount sub-plate 600 coupled to the folding appendage third embodiment 1130 of one embodiment.

Consumer Television/Monitor Mount Attachment

Figure 17A:
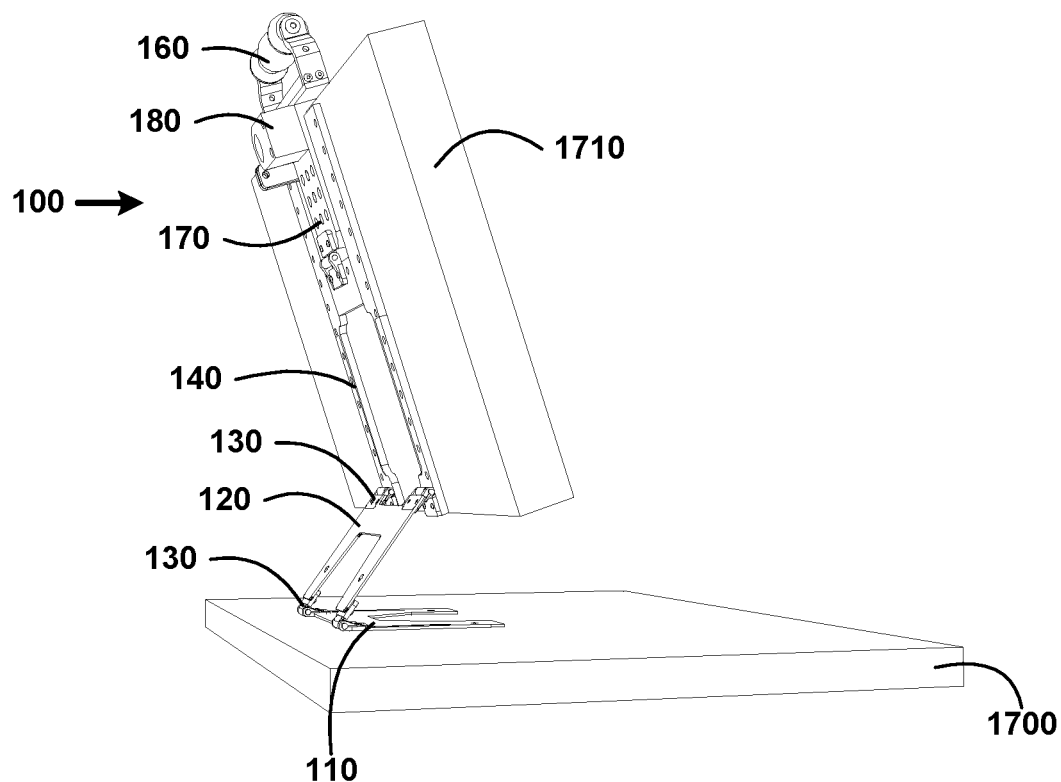
FIG. 17A shows for illustrative purposes only an example of consumer television/monitor mounted on a monitor mount with constant torque hinges of one embodiment.

FIG. 17A shows for illustrative purposes only an example of consumer television/monitor mounted on a monitor mount with constant torque hinges of one embodiment. FIG. 17A shows the monitor mount with constant torque hinges first embodiment 100 with for example a consumer television 1710 coupled to the mount. The monitor mount with constant torque hinges first embodiment 100 is attached to for example a desktop 1700 using the bifold desktop freestanding mount 110. The monitor mount with constant torque hinges first embodiment 100 is supported by the pulled down handle 160 coupled to the folding appendage first embodiment 170 and the bifold mount main body appendage 120 through the use of a plurality of the constant torque hinge first embodiment 130 coupled to the main body of the mount first embodiment 140 with the mount receptacle appendage first embodiment 180. A user can pick up the assemblage using the pulled down handle 160 of one embodiment.

The mount can be used specifically to aid in the mounting, powering, and/or physically supporting the weight of consumer-based televisions of any reasonable size and weight to which the mount can physically and electronically support. The total sum of conditions and descriptions of using the monitor mount with constant torque hinges to support monitors can also apply to the intended purpose of consumer television mounting along with any supporting appendages that may be used. The mount may be specifically catered in its embodiments to accommodate different monitors, televisions, electronic displays and other electronic devices. A user can adjust the angles of the mount and bifold mount main body appendage 120 to position the center of gravity of the assemblage of one embodiment.

Consumer Television/Monitor Bifold Desktop Appendage Attachment

Figure 17B:
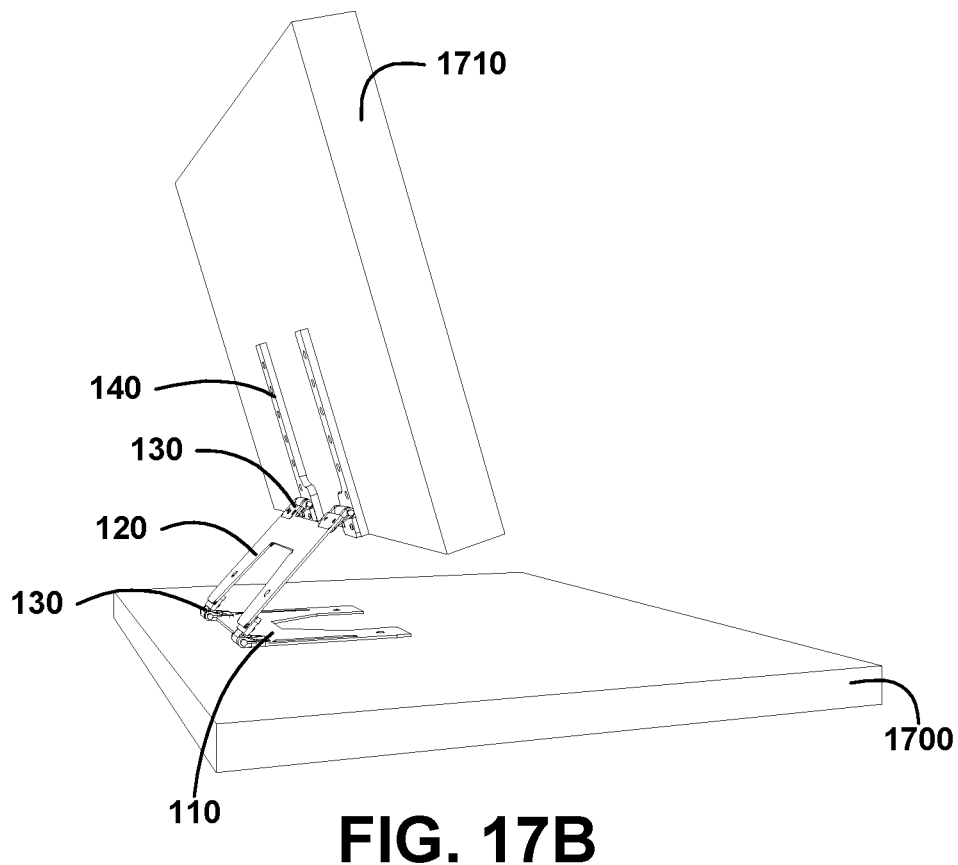
FIG. 17B shows for illustrative purposes only an example of consumer television/monitor mounted on a mount bifold desktop appendage of one embodiment.

FIG. 17B shows for illustrative purposes only an example of consumer television/monitor mounted on a mount bifold desktop appendage of one embodiment. FIG. 17B shows for example a consumer television 1710 coupled to the main body of the mount first embodiment 140 coupled to the bifold mount main body appendage 120 with a plurality of the constant torque hinge first embodiment 130. The bifold mount main body appendage 120 is coupled to the bifold desktop free-standing mount 110 with a plurality of the constant torque hinge first embodiment 130. The bifold desktop free-standing mount 110 is positioned flat against for example a desktop 1700. A user can adjust the angles of the mount and bifold mount main body appendage 120 to position the center of gravity of the assemblage. The bifold desktop free-standing mount 110 and bifold mount main body appendage 120 may be specifically catered in its embodiments to accommodate different monitors, televisions, electronic displays and other electronic devices.

Attaching the main body of the mount may be done using VESA mounting holes commonly found on the rear of the televisions, with common sizes such as 75, 100 and 200 mm in holes spacing distance. Other holes spacing pattern configurations may be accommodated by the mounting holes of the mount. Using these holes, the mount attaches to the TV using common screws compatible with the television mounting holes. In the case the mount is configured to support an AC-powered television, it may include the means to provide that power via an attached plate at any given voltage or power requirement, to the device which it also supporting.

The mount can be used to hold, and adjust the hold angle of any compatible consumer electronic equipment or devices, including smart phones, tablets, laptop computers, wireless devices, consumer televisions. The two plates can be joined using two or more constant torque hinges and a baby pin mount, or any other type of mounting configurations or mounting methods as described herein. Mounting methods may include hosting other mounts via mounting holes, straps, hooks and other mounts in accomplishing this task. A sub-plate housed battery such as a V-mount or Anton Bauer may be attached to power the devices which may be used with this mount to aid in the functionality of the consumer electronic device. Any combination of the mount characteristics may be utilized in the above mount description in previous descriptions.

The desktop free-standing mount can be composed of two or more combined plates held together by constant torque hinges attached to the main body of the mount or can reside as permanently attached as a permanent part of the mount. The bifold hinge arrangement may serve not as an addition to the main body of the mount but acting as the main body of the mount itself, serving a simpler function as a free-standing desktop mount or accordion extension to be used for other mounting options, such as a wall mount, or to hold other equipment or mounts.

This plate arrangement with its associated hinge movements are to be extended also as a bifold or trifold free-standing desktop mount for the monitor or device it is used with. It can be used for other purposes as an accordion style appendage, which can achieve a limitless angular and positional ability and be used for mounting other equipment or small mounts. Other appendages can be attached in any part of the plate and be used for mounting other equipment or mounts, handles, desktop supports or for attaching to a wall or wall mounts, or appendages supported by free or constant torque hinges. The mount may be able to fold in multiple configurations and be able to fold onto itself in a variety of ways to allow it to fold together to be compact and lay flat. The bifold/trifold mount may utilize locking features such as pins, latches and hooks so that the movement of the mount can be hindered by a locking feature. The other appendages used in these plates may have tapped and non-tapped holes or slots in order that screws or mounting options can be used in conjunction with them of one embodiment.

Handle Pivoted in a Counterclockwise Direction

Figure 18:
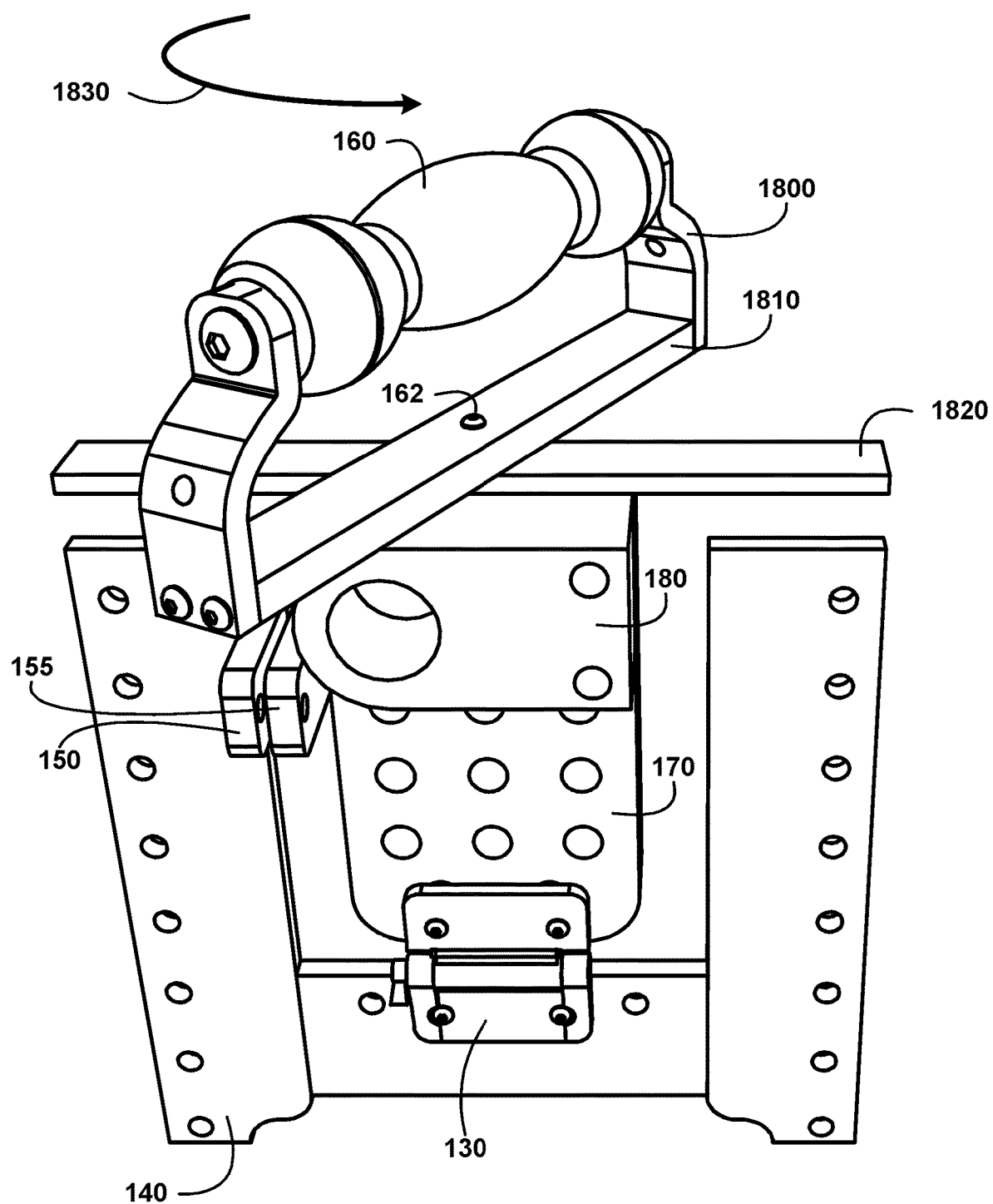
FIG. 18 shows for illustrative purposes only an example of handle pivoted in a counterclockwise direction of one embodiment.

FIG. 18 shows for illustrative purposes only an example of handle pivoted in a counterclockwise direction of one embodiment. FIG. 18 shows the main body of the mount first embodiment 140 including the fixed locking feature first embodiment 150, folding locking feature first embodiment 155, constant torque hinge first embodiment 130, folding appendage first embodiment 170 and the mount receptacle appendage first embodiment 180.

FIG. 18 shows a handle mounting bar coupled to folding appendage 1820. The handle 160 includes a handle support bracket 1800 and handle pivot bar 1810. The center pivot point 162 attaching bolt is coupled to the handle pivot bar 1810 allowing the handle 160 to be turned or pivoted about the center pivot point 162. FIG. 18 shows a handle pivoted in a counterclockwise direction 1830.

The mount may include the use of a handle 160 or more than one handle, which can serve more than one purpose: 1) carrying a monitor or device to which the mount is securely attached by hand, and 2) mounting other devices onto the handle or on the side of the handle. For monitors which size and weight rating make it suitable for carrying by hand, a handle 160 may be present on the mount, or any of the supporting appendages or plates. In the case which a handle 160 is attached, at least two handle support bracket 1800 features can be used to hold the handles in place, and may in fact fold or swivel in and out as needed for use, providing a smaller footprint when the handle is flattened into a stowed, flat position.

The swivel or pivoting action would also serve as a varying type of handle position for various monitor handling. The handles or their supporting brackets may include the use of mounting holes, tapped or non-tapped, for attaching additional devices or mounts. The handle 160 may be configured to be removable and/or flipped or folded for a low-profile stowing technique or to better position the handle to accommodate different models of monitors. The handle able to be used physically above the top of the monitor which will allow the handle to be nearer the monitor's center of gravity. As it pertains to physical leverage of the mount, the handle(s) serve as a method to gain leverage as to manipulate higher-constant torque hinges attached to the mount and with its connected plate. The constant torque hinges may not be able to be moved even with an attached plate unless a handle is used due to the strength of the friction being higher than an operator can handle without proper leverage. The handle therefore serves as a method to more easily pull the adjoined plate from the body of the mount while affixed to the rear of a monitor, as well as pushing it from an extended position back into the monitor, typically for stowing purposes.

The handle(s) may be configured in a side-facing configuration to which they may fold in or out, approaching or exceeding the sides of the monitor for example for holding monitors on each side, or can fold all the way in to the monitor for stowing. The handle can also serve as a means of hand-carrying a monitor or device along with the mount itself along with other devices which may be attached. The monitor may be physically picked up and supported by this mount by means of the handle(s) safely, so as long as the combined force of ft-lb pressure from the weight of the monitor with any attached plates or devices does not exceed a reasonable amount of force which the mount and monitor can withstand. The handle(s) is to be used to carry a monitor only when in the stowed and locked position.

When extended, the handle may serve other purposes, such as a way of grabbing the monitor to position it while it is mounted, or to position the stand it is using, or to attach other gear onto, or to adjust the viewing angle such that the handle is acting as a desktop mount resting point, or it may serve as a mounting which may be available for use via the handle or any bracket holding the handle.

The handle and/or its bracing may include the mechanics necessary to turn the handle in any direction and then lock it at any angle. An example is a lever which is pulled by the fingers while gripping the handle. This lever can engage or disengage the lock to accomplish this task, and may be spring-loaded. It may be located on the handle support bracket 1800 or handle pivot bar 1810 within reach of the fingers.

Main Body of the Mount Attachment Slot

Figure 19A:
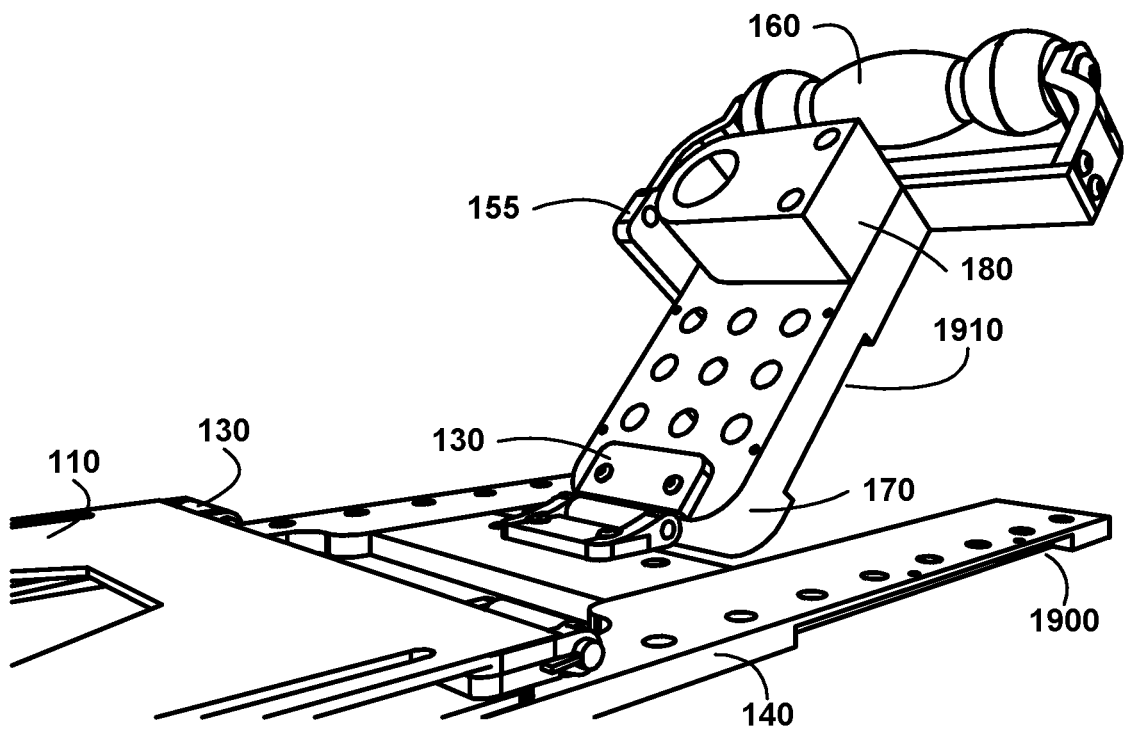
FIG. 19A shows for illustrative purposes only an example of main body of the mount attachment slot of one embodiment.
Figure 19B:
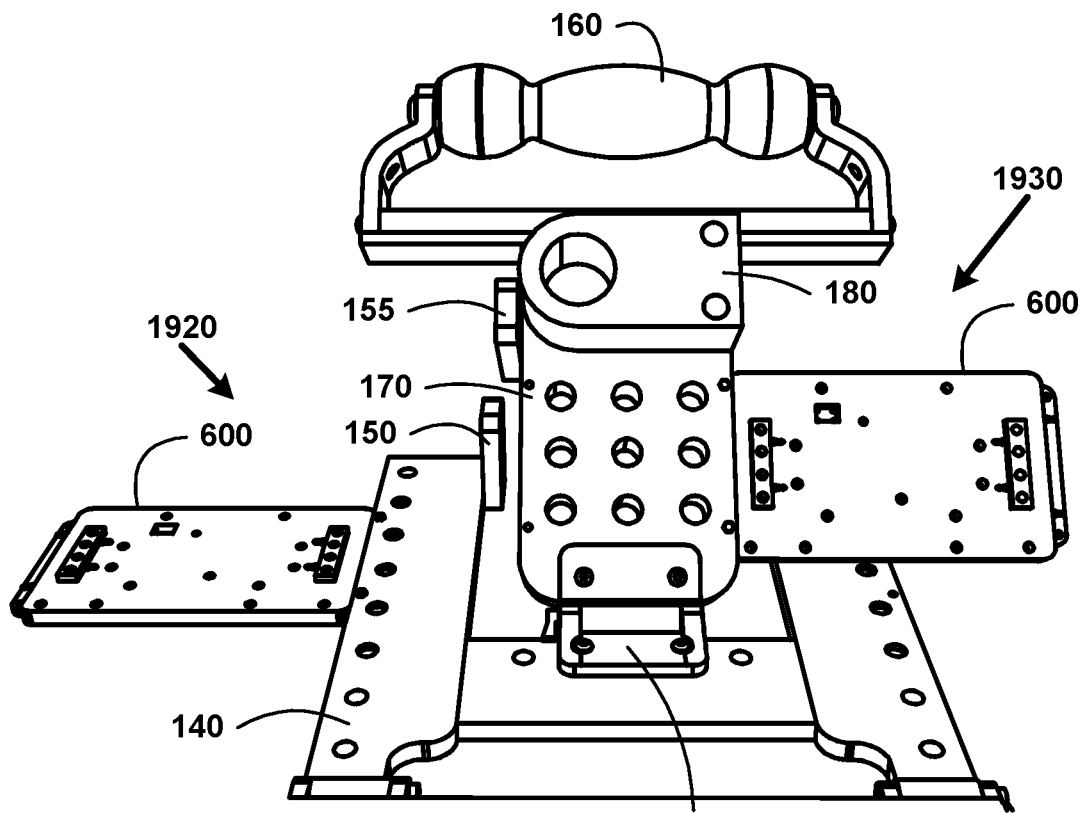
FIG. 19B shows for illustrative purposes only an example of mount sub-plate coupled in main body of the mount attachment slot of one embodiment.

FIG. 19A shows for illustrative purposes only an example of main body of the mount attachment slot of one embodiment. FIG. 19A shows the bifold desktop free-standing mount 110, constant torque hinge first embodiment 130, folding locking feature first embodiment 155, handle 160 and mount receptacle appendage first embodiment 180.

The main body of the mount first embodiment 140 is shown with a main body of the mount first embodiment attachment slot 1900. The folding appendage first embodiment 170 is shown with a folding appendage first embodiment attachment slot 1910. An attachment slot may be used for coupling a sub-plate slot to the main body of the mount and/or used for coupling a sub-plate slot to the folding appendage. The attachment slot will allow attachment of a sub-plate which is extended outward from the main body of the mount and/or folding appendage to which it is attached.

This is particularly useful in the cases when a user may need to have a center point of gravity on the mount when a battery or other item is affixed to the sub-plate and attached to the mount main body, or the light stand, C-stand or other mounting methods as described in this document. The sub-plate and its receiving slot connectivity and securing method may be located anywhere on the mount, and on any section of one embodiment.

Mount Sub-Plate Coupled in Main Body of the Mount Attachment Slot

FIG. 19B shows for illustrative purposes only an example of mount sub-plate coupled in main body of the mount attachment slot of one embodiment. FIG. 19B shows the constant torque hinge first embodiment 130, fixed locking feature first embodiment 150, folding locking feature first embodiment 155, handle 160 and mount receptacle appendage first embodiment 180. FIG. 19B also shows the a first mount sub-plate 600 and main body of the mount 140 wherein a first mount sub-plate coupled in main body of the mount first embodiment attachment slot 1920. FIG. 19B also shows the mount sub-plate 600 and folding appendage first embodiment 170 wherein a second mount sub-plate coupled to folding appendage first embodiment attachment slot 1930 of one embodiment.

Rotation Device

Figure 20A:
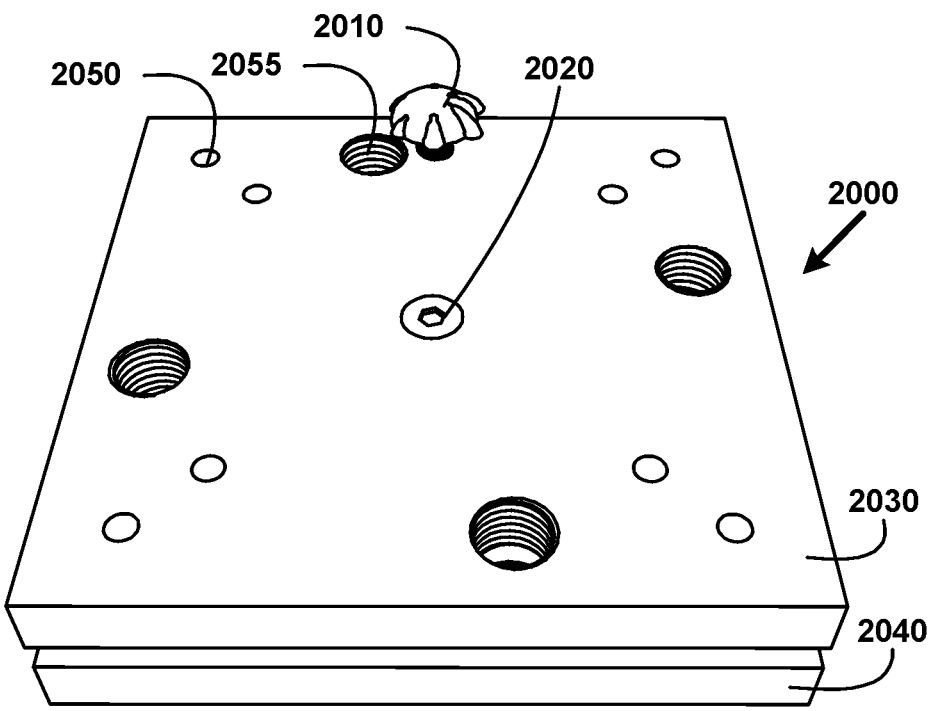
FIG. 20A shows for illustrative purposes only an example of a rotation device of one embodiment.

FIG. 20A shows for illustrative purposes only an example of a rotation device of one embodiment. FIG. 20A shows a rotation device 2000 used to rotate for example a screen coupled to a monitor mount. A second embodiment of the shoulder bolt pivot 2020 with a flush hex head can be fed through a top rotation plate 2030 and threaded into a bottom rotation plate 2040. The rotation of the bottom rotation plate 2040 is concentric with the axis of the second embodiment of the shoulder bolt pivot 2020. The bottom rotation plate 2040 can be attached for example to a monitor or screen device and angled as desired by a user. A braking adjustment bolt 2010 can be threaded through the top rotation plate 2030 to apply pressure against a braking disc to adjust the rotation of the bottom rotation plate 2040. The braking disc rest on the face of the bottom rotation plate 2040. Adjusting the braking adjustment bolt 2010 to apply a greater amount of pressure against the braking disc and in turn the bottom rotation plate 2040 reduces the free rotation of the bottom rotation plate 2040 thus allowing the rotated angle of the bottom rotation plate 2040 to be maintained. The bottom rotation plate 2040 includes a plurality of a lock hole 2050 and a plurality of a threaded attachment hole 2055 for use in attachment to a device to be rotated of one embodiment.

Rotation Device

The main body mount can be manufactured with or without an added mechanism that would allow the monitor or mounted device to be rotated and locked at any degree. For example, a monitor can be rotated and held in a portrait arrangement or landscape, or any angular position in between while attached to the mount. It can be configured and used as a stand-alone device to which the main body mount would be attached using screws, thumb screws, latches, or catches. The top rotating piece can be integrated into the design of the main body mount. The mount can spin freely and be able to be locked, or, it can be designed to maintain a constant rotational position by means of friction between the two moving parts. The rear of the rotating device can be mounting to other objects besides a monitor. It can be mounted to a wall, other mounts, or to other equipment. The same applies to the front piece.

Stand-Alone Rotating Mount

When used as a standalone rotating mechanism, two independent pieces will be used. The rear piece 5 will be mounted to a monitor or other device; the front piece 3 is to be a host as to which another mount or device can be affixed. Both pieces will be attached to one another, permanently or semi-permanently, in the centers of each plate using a solid or hollow pin, bolt, bearings, rivet, or other mechanism or combination thereof. This mechanism will allow one piece to freely turn or spin in relation to the other piece, with or without friction, securely and preventing them from coming apart. The rear piece will have holes in them as to secure it to a monitor or other device using screws with its through holes. These include the standard size is found in VESA mounting schemes and any others, and may be countersunk as to maintain a flat surface for the front plate to spin on.

As a stand-alone device, the rotating mount can host a variety of third-party mounts which may be able to be attached to it. Both pieces may have matching VESA holes present, or a combination of it or any other mounting spacing. The stand-alone mount would allow any mount that has the same mounting hole configuration, that does not already have a rotating feature, to have the ability to attach the stand-alone mount. In other words, it allows any mount to be able to rotate and lock the monitor or other device in the desired rotated position when it would have not been able to otherwise.

The front piece will have similar whole layouts as the rear plate, such as VESA mounting schemes or any other combination throughout. They may be threaded or through hole, and may contain mounting pieces such as threaded rod or other pieces for the purposes of securing devices which will attach to it.

The front piece will be able to swivel on the rear piece without coming off. It will be able to swivel only when it in its unlocked position. This will allow the monitor to be able to be turned horizontal lay or vertically freely, or potentially any position in between (360 degrees). When the mechanism is locked, the monitor or device which has the device attached to it will not be able to be moved regardless of the angular rotated position that it is in, or if there is a monitor or device attached to it or not. An attached device must be within the physical supporting tolerance of the overall structure. The monitor or device shall be allowed to rotate while the mount is attached, mounted and supported by an appropriate stand. The monitor need not be removed in order to be rotated.

Rotation Device a Rotated Position

Figure 20B:
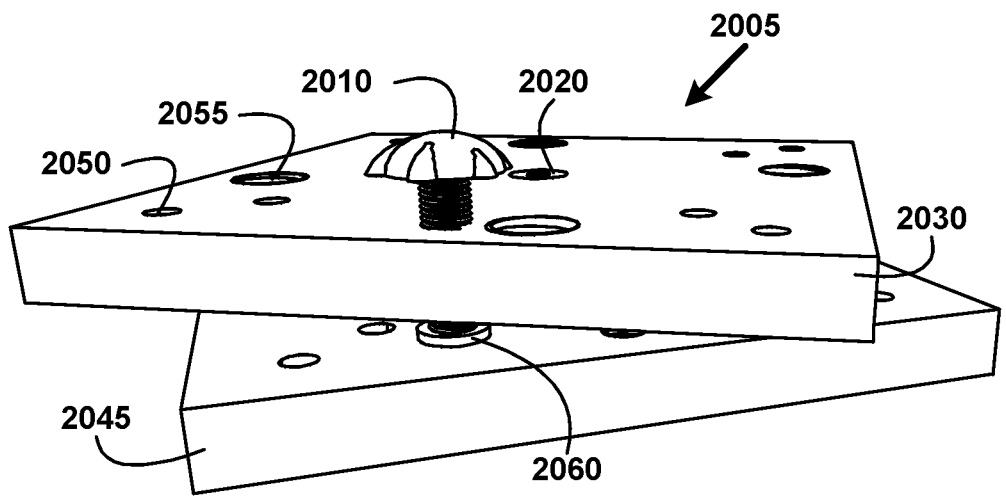
FIG. 20B shows for illustrative purposes only an example of a rotation device in a rotated position of one embodiment.

FIG. 20B shows for illustrative purposes only an example of a rotation device in a rotated position of one embodiment. FIG. 20B shows a rotated rotation device 2005. Showing on the top rotation plate 2030 is the braking adjustment bolt 2010, second embodiment of the shoulder bolt pivot 2020, lock hole 2050, and threaded attachment hole 2055. Also showing is the braking adjustment bolt 2010 protruding from top rotation plate 2030 and pressing against the braking disc 2060 and against the bottom rotation plate rotated 2045 of one embodiment.

Unextended Indexing Pin

FIG. 20C shows for illustrative purposes only an example of an unextended indexing pin of one embodiment. FIG. 20C shows an unextended indexing pin 2070 including a push/pull knob 2071, index pin 2072 and attachment collar 2073 of one embodiment.

Extended Indexing Pin

FIG. 20D shows for illustrative purposes only an example of an extended indexing pin of one embodiment. FIG. 20D shows an extended indexing pin 2080 including the push/pull knob 2071 used to push the indexing pin 2072 through the attachment collar 2073 of one embodiment.

Rotation Device in a Locked Rotated Position

FIG. 20E shows for illustrative purposes only an example of an extended indexing pin in a rotation device in a locked rotated position of one embodiment. FIG. 20E shows the extended indexing pin 2080 in a locked rotated position inserted into a rotation indexing hole. The indexing pin 2072 can be of any length to reach from one face of the top rotation plate 2030 to the corresponding face of the bottom rotation plate 2040 and into the receiving locking hole. The rotation device 2000 includes in one embodiment the shoulder bolt pivot 2020, braking adjustment bolt 2010, threaded attachment hole 2055, lock hole 2050, top rotation plate 2030, bottom rotation plate 2040 and braking disc 2060.

Integrated Rotation Plate

Figure 21A:
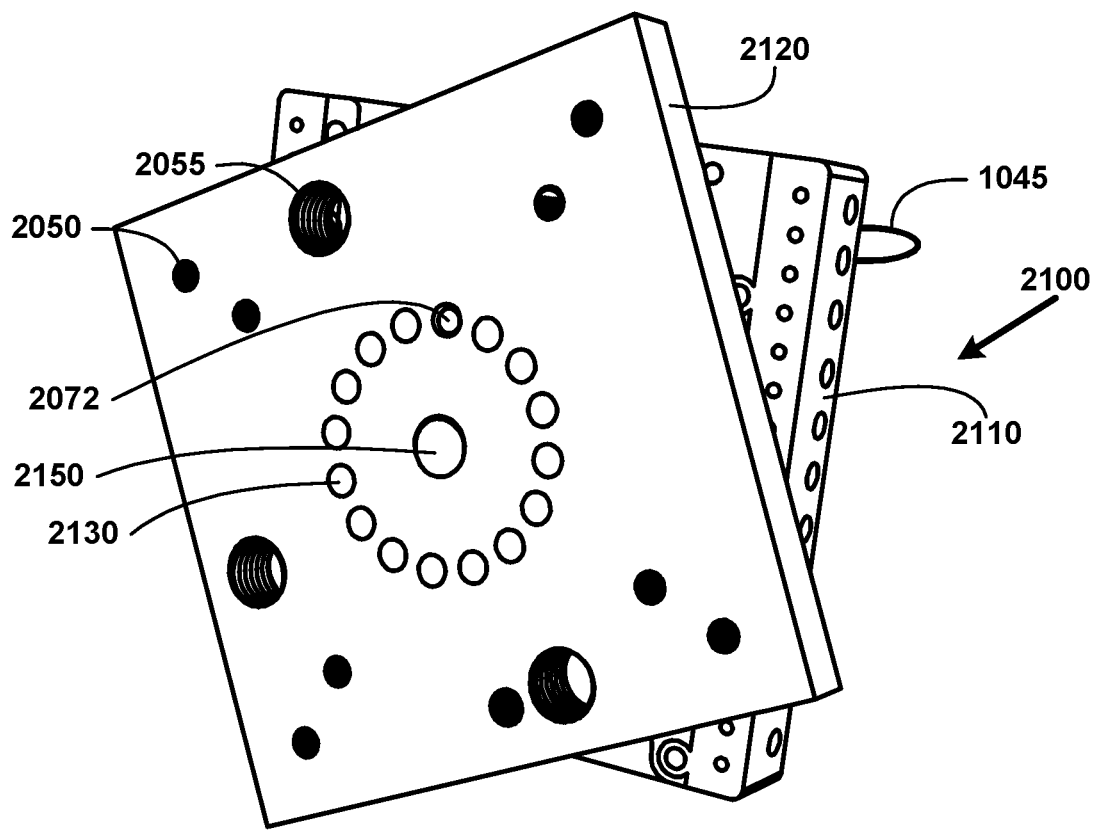
FIG. 21A shows for illustrative purposes only an example of an integrated rotation plate bottom view of one embodiment.

FIG. 21A shows for illustrative purposes only an example of an integrated rotation plate bottom view of one embodiment. FIG. 21A shows an integrated rotation device 2100 including an integrated bottom rotation plate 2120 and an integrated top rotation mount plate 2110. Showing on the bottom rotation plate 2120 is the lock hole 2050 and threaded attachment hole 2055 used for attachments. The bottom rotation plate 2120 includes a series of radial indexing holes 2130. The indexing holes 2130 can be made spaced at various incremental angular degrees to allow the indexing rotation in those increments. The threaded terminus of a second embodiment of the shoulder bolt pivot 2020 can be seen seated at the face of the bottom rotation plate 2120 of one embodiment. A bevel terminus of an indexing pin 2072 is seen in an indexing hole in a locked position. Also showing is the fixed locking feature pull ring 1045 of one embodiment.

Integrated Rotating Mount

As an integrated feature of the main body mount, the rotating device "top plate" may be integrated into the main body mount itself, being one molded or milled piece. Essentially, the "top plate" may be the actual mount itself. In this scenario, this top "plate" may be in the form of any shape, including that of the mount itself, or a modified version of it in order to allow it to work as a rotating mount.

Rotational Position Guidance

The rotating mount may include positioning hardware or bearing holders to help in the guiding of particular rotation angles. For example, if the monitor needs to be mounted in a portrait position, a method may be used so that the operator may feel a "click", bump or physical resistance at this particular angle. In this case it would be at 90 degrees from a typical landscape position. Any rotational angle may use this method.

Rotational Locking Methods

The mount can be locked in rotational degree in relation to rear and front plate. To accomplish this, one or more retractable pins or screws may be used, indexing pins, pushpins, screws, thumb screws, captive screws, clamps, or any other means available to prevent the two pieces from moving rotation, in any portion or location of the mount or front piece of the standalone rotating mount. The locking mechanism will prevent the rotation of the two pieces. In the case of a pin or threaded screw being used, it would be inserted and secured through both front and rear plates for locking, thus holding the desired angle of the monitor which it is affixed to.

For unlocking, they would be able to be removed from the rear plate. In the case of an indexing pin or other pan used to stop rotation, appropriately spaced through-holes may be utilized in the rear piece to accomplish this task. This may include a circular pattern in the rear plate composed of mating holes to the locking mechanism affixed to the front plate. In the case of a screw or other method requiring a tapped hole being used, these holes will be tapped. In the case of a smooth pin-style locking method, they may be through-holes. Using tapped holes will provide extra support for holding position and holding the two plates together. A locking method using clamps may also be used. The clamps may force the two plates together or push one against the other.

In the case of a friction-based lock method between two plates, the "lock" may simply be the force of the center pin or screw which causes a locking friction, preventing rotation until physically forced by an operator. (NOTE: The following mount does that so I don't know if I can patent it.

Locking Method when Main Body Mount is Attached or Integrated

A locking mechanism, such as a thumb screw or captive screw head may extrude through a hole that can be present through piece 1070. In this way, the locking mechanism of the rotation adjustment will not impede the main body mount from stowing into a locked position. This can be accomplished by boring a hole larger than the diameter of the handle or screw head, etc. This method may be true in either the stand-alone rotation mount, or the integrated rotation mount.

Braking Disc as Part of a Lock

The locking mechanism may use a braking disc. This would utilize a method in applying pushing or pulling force to the rear plate in relation to the front plate. In one method, a thumb screw or equivalent tightening method would be used to produce pushing force from the front plate onto the rear plate. A disc being placed on the rear of the front plate in a cavern cutout would prevent the screw or thumbscrew from directly hitting the rear piece, preventing damage to the rear plate from the pressure of the screw or the thumbscrew. The disc will help distribute the pressure that will be placed on the rear plate, which can increase the effectiveness of its holding power. This disc can include extrusions or indents, or be cut or bent in any shape in order to mate with the inside plate, which will have the same mating form. This would prevent the rotating mount from sliding and moving out of its rotated position when in it is in a locked position and having force applied. However, the rear disc would allow the amount to freely rotate while in its unlocked position. The braking disc may also be used in conjunction with a clamp-style locking method.

Rotating Mount Composition

The rotational mount may be composed of metal of any kind, or any other substrate strong enough to support the specified load weight. The mount may be in the form of any shape, whether it be square, round, or with any cutouts or curves. They may be shaped to complement the main body mount, or other third-party mounts, monitors, or other equipment it may mount on to. This includes the front and rear plates. Holes may be present in either piece to accommodate screw mounting access, such as for gaining physical access to the 75 mm holes on the bottom plate. This will be necessary if the top plate is a square shape, for example (2). Holes may be present on the rear for any mounting purposes or accommodations to fit or align the mount with any monitor or device.

Integrated Rotation Plate Top View

Figure 21B:
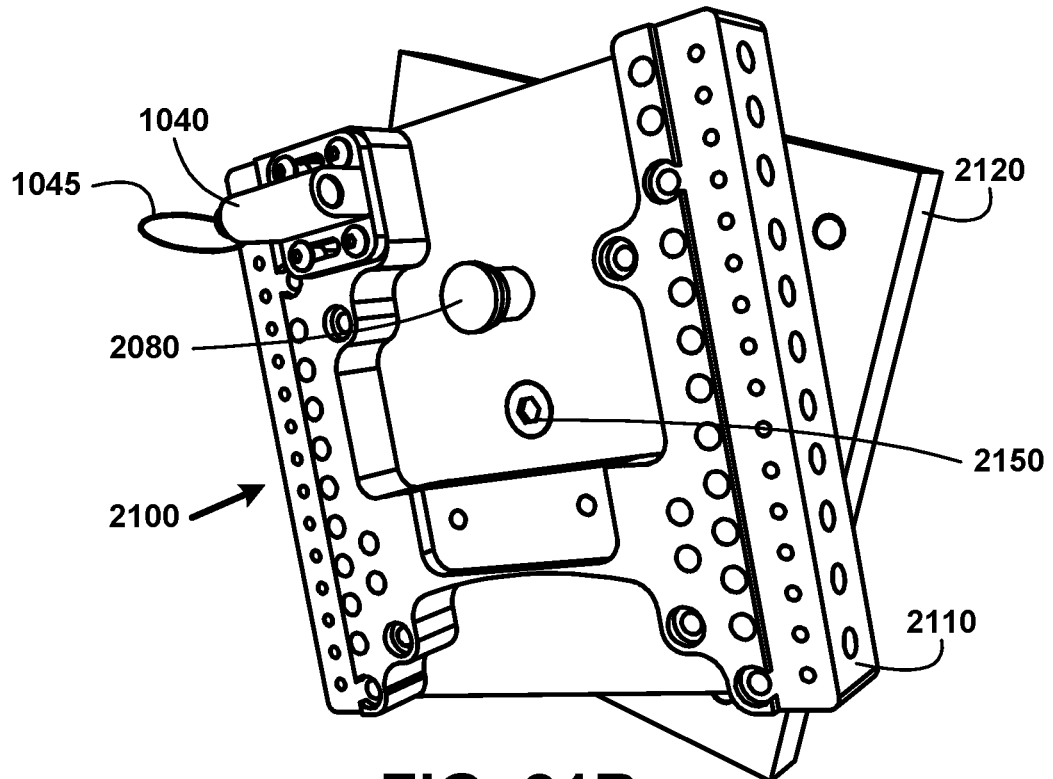
FIG. 21B shows for illustrative purposes only an example of an integrated rotation plate top view of one embodiment.

FIG. 21B shows for illustrative purposes only an example of an integrated rotation plate top view of one embodiment. FIG. 21B shows the integrated rotation device 2100 including the bottom rotation plate 2120, the second embodiment of the shoulder bolt pivot 2020 with a flush hex head, integrated top rotation mount plate 2110, the fixed locking feature second embodiment 1040, fixed locking feature pull ring 1045, and extended indexing pin 2080 of one embodiment.

Integrated Rotation Plate Coupled to a Monitor Mount Bottom View

Figure 22A:
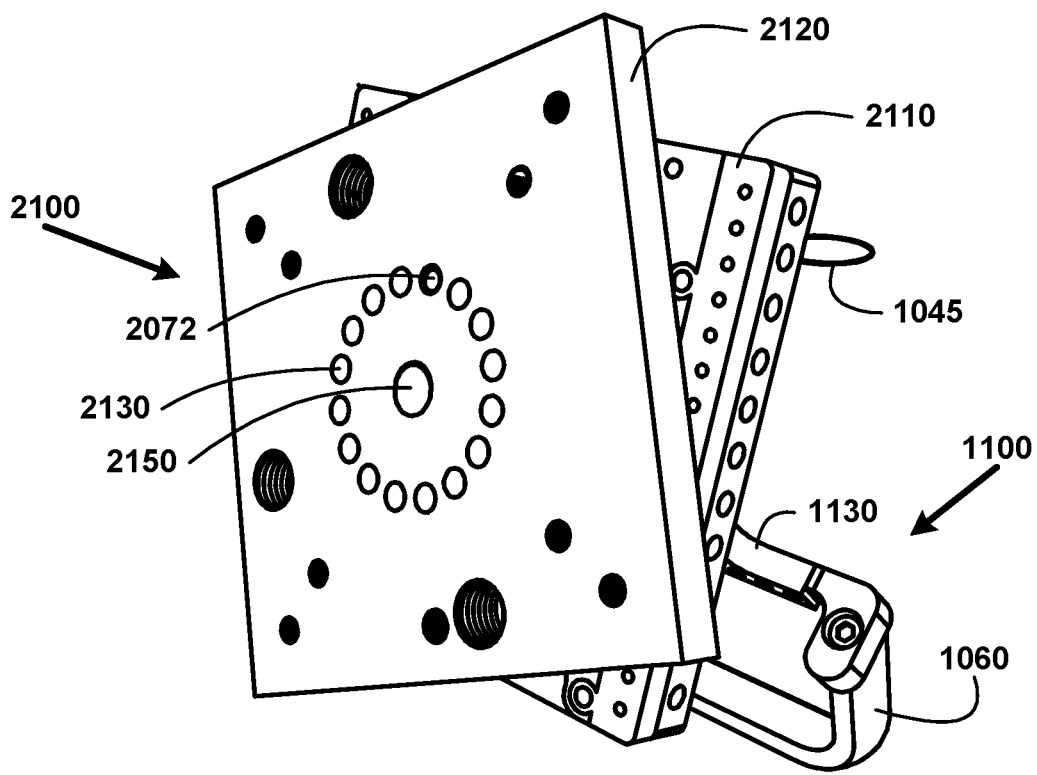
FIG. 22A shows for illustrative purposes only an example of an integrated rotation plate coupled to a monitor mount bottom view of one embodiment.

FIG. 22A shows for illustrative purposes only an example of an integrated rotation plate coupled to a monitor mount bottom view of one embodiment. FIG. 22A shows the integrated rotation device 2100 including the integrated bottom rotation plate 2120 and integrated top rotation mount plate 2110 coupled to the monitor mount with constant torque hinges third embodiment 1100 from a bottom view. The integrated bottom rotation plate 2120 includes the radial indexing holes 2130. The threaded terminus of a second embodiment of the shoulder bolt pivot 2020 can be seen seated at the face of the bottom rotation plate 2120. A bevel terminus of an indexing pin 2072 is seen in an indexing hole in a locked position. The integrated rotation device 2100 can be coupled to any embodiment of the monitor mount. The monitor mount with constant torque hinges third embodiment 1100 including the, fixed locking feature pull ring 1045 of the fixed locking feature second embodiment 1040 of FIG. 10, folding appendage third embodiment 1130 and angled handle 1060. The monitor mount and integrated rotation device 2100 can be integrated into electronic devices including electronic devices including, wired and wireless communication electronics, high definition televisions and monitors, consumer televisions and monitors a monitor or other device including a flat screen television, and a computer monitor during manufacture. The integration of one or both of the monitor mount and integrated rotation device 2100 can allow those electronic devices to be self-supporting without the addition of a third party support device of one embodiment.

Integrated Rotation Plate Coupled to a Monitor Mount Top View

Figure 22B:
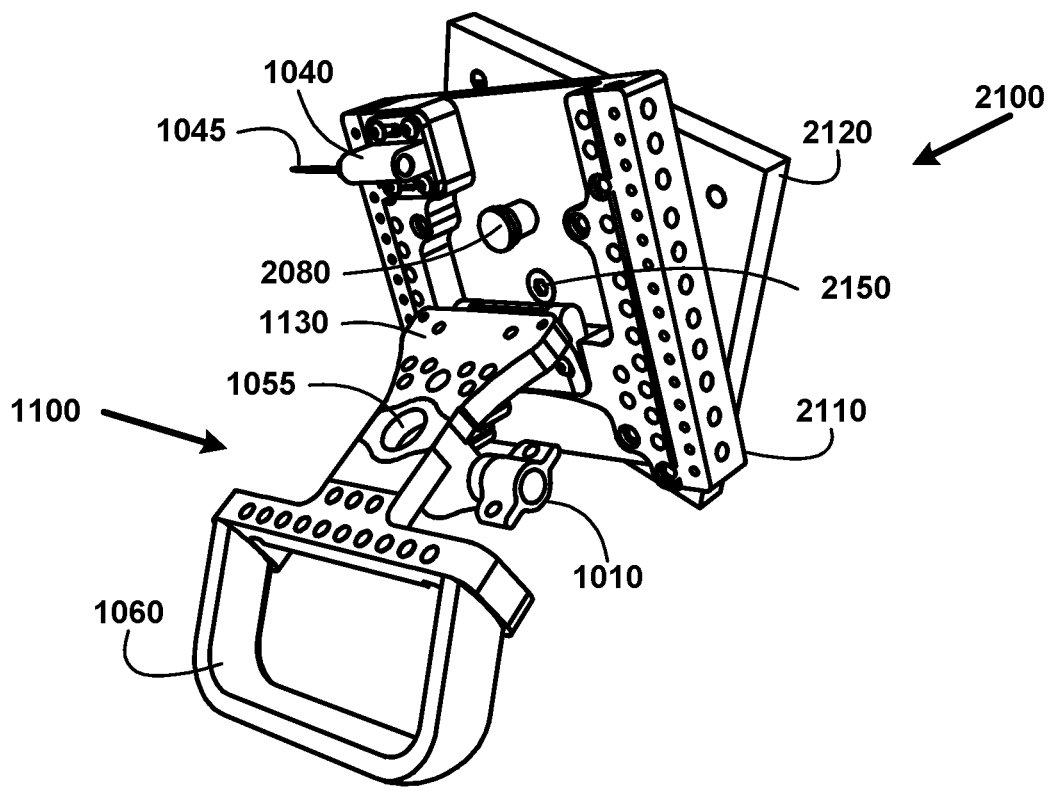
FIG. 22B shows for illustrative purposes only an example of an integrated rotation plate coupled to a monitor mount top view of one embodiment.

FIG. 22B shows for illustrative purposes only an example of an integrated rotation plate coupled to a monitor mount top view of one embodiment. FIG. 22B shows the integrated rotation device 2100 from a top view coupled to the monitor mount with constant torque hinges third embodiment 1100. The integrated rotation device 2100 is showing the second embodiment of the shoulder bolt pivot 2020 with a flush hex head. Shown is the integrated bottom rotation plate 2120, and integrated top rotation mount plate 2110. The monitor mount with constant torque hinges third embodiment 1100 is showing the folding appendage third embodiment 1130, pipe mounting receptacle securing tab 1010, pipe mounting receptacle second embodiment 1055, angled handle 1060, fixed locking feature second embodiment 1040 and fixed locking feature pull ring 1045. Also showing is the extended indexing pin 2080 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. An apparatus, comprising:
   a television monitor mount with a folding appendage coupled to a predefined main body;
   a constant torque hinge on a plate having at least one handle configured to be affixed to a structure that is configured to hold other plates and either contains or holds at least one monitor;
   a plate portion of the main body configured with mounting holes to connect to corresponding mounting holes of a monitor being mounted;
   at least one locking mechanism configured with lockable positions on the plate portion of the main body; and
   wherein the folding appendage of the mount along with the main body is configured to mount to other mounts or similar devices.

2. The apparatus of claim 1, further comprising the folding appendage of the mount along with the main body are configured to mount to similar devices consisting of at least one of battery plates, AC/DC switching supplies, electronic converters or other mounts.

3. The apparatus of claim 1, further comprising the mount includes power connectivity integrated throughout the body of the mount consisting of at least one from a group of circuit boards, electronic substrates containing electric wiring, LEDs, electronic power supplies, converters, power generators and electronic equipment and configured for mating power connections carrying voltage and current to other plates.

4. The apparatus of claim 1, further comprising the folding appendage including a bifold mount main body configured for coupling to the main body for supporting a monitor, the bifold mount main body configured to function as a free-standing mount when the monitor is coupled to the bifold mount main body independent of any other mounting supports.

5. The apparatus of claim 1, further comprising the at least one handle configured for pivoting about a center pivot point in a clockwise or counterclockwise direction, for being removable, flipped or folded for a low-profile stowing, and locked into a stowed position for carrying by hand devices and appendages coupled to the handle.

6. The apparatus of claim 1, further comprising the constant torque hinge configured to incorporate a dual-functionality with free-movement and resistive friction in one hinge assembly wherein the constant torque hinge configured to utilize an engaging or disengaging device that allows it to switch between being a loose, free moving hinge to a friction-type hinge, and vice versa.

7. The apparatus of claim 1, further comprising a mount sub plate configured for attachment to the mount and for attachment of other devices to the mount sub plate.

8. The apparatus of claim 1, further comprising an AC/DC switching supply configured for attachment to the mount and providing an AC input, USB power out SVDE, DC output 12 VDC and internal connector to a sub-plate 850 for inserting a DC output connector or cable jack for supplying power to electronics and devices attached to the mount.

9. The apparatus of claim 1, further comprising a side mounted plate configured to include attachment bolt holes for attaching to the mount and other equipment attachment holes for attaching other device and equipment associated with the mount application.

10. The apparatus of claim 1, further comprising a mount receptacle appendage configured for attaching to the mount other mounts including baby pins, C-stand mounts, microphone mount, wall mounts or other common mounting configurations.

11. An apparatus, comprising:
    a main body of a mount device configured to include parallel appendages joined with a cross piece for supporting electronic devices;
    at least one folding appendage coupled to the main body of the mount device configured for supporting electronic devices, other mounts or similar devices;
    a handle configured to couple to the folding appendage for providing support of televisions, monitors and other electronic devices coupled to the main body of the mount device and configured for carrying the monitor by the handle; and
    at least one constant torque hinge coupled to the main body of the mount device and the at least one appendage configured for providing resistive angular movement for the at least one appendage.

12. The apparatus of claim 11, further comprising the main body of the mount device including a monitor mount integrated into the main body during manufacture configured for supporting electronic devices including electronic devices including, wired and wireless communication electronics, high definition televisions and monitors, consumer televisions and monitors, and power source supplies for the electronic devices.

13. The apparatus of claim 11, further comprising the at least one appendage includes an additional appendage from a group consisting of mounting plates, sub-mounts, a rotation device configured for rotating a monitor and holding it in the rotated position, a bifold plate desktop free-standing mount, a plurality of the at least one constant torque hinge, a mount receptacle appendage, and other mount appendages coupled to the main body of the mount device with at least one constant torque hinge each.

14. The apparatus of claim 11, further comprising the at least one constant torque hinge mechanism configured to be spring loaded, compression locked or other resistive force method and configured to apply resistance in one direction over another.

15. The apparatus of claim 11, further comprising a locking mechanism coupled to the main body of the mount device configured to lock the at least one folding appendage into a stowed position.

16. An apparatus, comprising:
    the apparatus configured to function as a bifold plate desktop free-standing mount, the apparatus comprising a plurality of torque hinges, a mount device including a main body, and a bifold mount main body appendage couple to the main body of the mount device using one of the plurality of torque hinges;
    a folding appendage configured to be coupled to the main body of the mount device using another of the constant torque hinge;

a mount sub-plate configured to be coupled to the main body of the mount device for providing electrical and electronic connectivity to the main body of the mount device; and a handle configured to couple to the folding appendage for providing support of televisions, monitors and other electronic devices coupled to the main body of the mount device.

17. The apparatus of claim 16, further comprising the bifold mount main body appendage configured to include two or more mounting plates that are coupled to each other and the main body of the mount device using a plurality of the constant torque hinges and to provide support to at least one television, monitor and other electronic device on a desktop.

18. The apparatus of claim 16, further comprising at least one locking mechanism configured to include a fixed locking feature coupled to the main body of the mount device and a folding locking feature coupled to the folding appendage for locking the folding appendage in any angular degree set by an operator.

19. The apparatus of claim 16, further comprising the handle coupled to the folding appendage configured to include at least one functionality including pivoting about a center pivot point, flipping or folding flat for storage, locks including indexing pins or other type of latches to prevent the handle from moving or sliding from a indexed pivoted position.

20. The apparatus of claim 16, further comprising the mount sub-plate configured to include conductive pins or fiber optic connection features including blocks with embedded receptacles and embedded conductive pins and configured to include at both ends an attachment flange for coupling to at least one attachment slot of the main body of the mount device.

* * * * *